United States Patent
Ozturk et al.

(10) Patent No.: US 11,277,857 B2
(45) Date of Patent: *Mar. 15, 2022

(54) DISCONTINUOUS RECEPTION AND SCHEDULING TECHNIQUES IN WIRELESS COMMUNICATION SYSTEMS USING MULTIPLE TRANSMISSION TIME INTERVALS

(71) Applicant: QUALCOMM Incorporated, San Diego, CA (US)

(72) Inventors: Ozcan Ozturk, San Diego, CA (US); Wanshi Chen, San Diego, CA (US); Jing Sun, San Diego, CA (US); Shimman Arvind Patel, San Diego, CA (US); Seyedkianoush Hosseini, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,254

(22) Filed: Aug. 7, 2020

(65) Prior Publication Data

US 2020/0374906 A1    Nov. 26, 2020

Related U.S. Application Data

(62) Division of application No. 15/807,952, filed on Nov. 9, 2017, now Pat. No. 10,779,312.

(Continued)

(51) Int. Cl.
*H04W 52/02* (2009.01)
*H04W 72/12* (2009.01)
(Continued)

(52) U.S. Cl.
CPC .... *H04W 72/1278* (2013.01); *H04W 52/0225* (2013.01); *H04W 72/14* (2013.01); *H04W 76/28* (2018.02); *Y02D 30/70* (2020.08)

(58) Field of Classification Search
CPC ......... H04W 52/0225; H04W 72/1278; H04W 72/14; H04W 76/28; Y02D 30/70;
(Continued)

(56) References Cited

U.S. PATENT DOCUMENTS 8,126,483 B2    2/2012  Lee et al.
8,385,241 B2    2/2013  Yu et al.
(Continued)

FOREIGN PATENT DOCUMENTS

EP    3261394 A1    12/2017
WO    WO-2016064048 A1    4/2016
WO    WO-2016133122 A1    8/2016

OTHER PUBLICATIONS

International Preliminary Report on Patentability—PCT/US2017/060994, The International Bureau of WIPO—Geneva, Switzerland, dated May 23, 2019.

(Continued)

*Primary Examiner* — Alpus Hsu
(74) *Attorney, Agent, or Firm* — Holland & Hart LLP

(57) ABSTRACT

Described techniques provide for communications using multiple different transmission time intervals (TTIs) while in a configured DRX mode that allows efficient scheduling and allocation of resources, and relatively efficient power usage at a user equipment (UE). In some cases, two or more available TTIs for transmissions between a base station and a UE may be identified, and a DRX cycle configured based at least in part on the available TTIs. During monitoring periods of a configured DRX cycle for a first TTI, the UE may be configured to monitor for control signal transmis- (Continued)

sions associated with a different TTI duration. In some cases, resources for a shorter TTI may be allocated using a two-stage grant. In some cases, multiple component carriers may be configured for one or more different TTIs, and one component carrier may be used to cross schedule resources on other component carriers.

30 Claims, 26 Drawing Sheets

Related U.S. Application Data

(60) Provisional application No. 62/420,867, filed on Nov. 11, 2016.

(51) Int. Cl.
  *H04W 72/14* (2009.01)
  *H04W 76/28* (2018.01)

(58) Field of Classification Search
  CPC ............... Y02D 70/00; Y02D 70/1242; Y02D 70/1262; Y02D 70/1264; Y02D 70/142; Y02D 70/146; Y02D 70/20; Y02D 70/21; Y02D 70/22; Y02D 70/24
  See application file for complete search history.

(56) References Cited

U.S. PATENT DOCUMENTS

| | | |
|---|---|---|
| 8,488,521 B2 | 7/2013 | Wang et al. |
| 8,774,138 B2 | 7/2014 | Ramos et al. |
| 8,908,581 B2 | 12/2014 | Ho et al. |
| 9,161,371 B2 | 10/2015 | Ehsan et al. |
| 9,313,734 B2 | 4/2016 | Jamadagni et al. |
| 9,325,465 B2 | 4/2016 | Wang et al. |
| 9,386,524 B2 | 7/2016 | Feuersaenger et al. |
| 9,402,229 B2 | 7/2016 | Wang et al. |
| 9,521,686 B2 | 12/2016 | Kaminski et al. |
| 9,615,329 B2 | 4/2017 | Tabet et al. |
| 9,629,084 B2 | 4/2017 | Wang et al. |
| 9,642,181 B2 | 5/2017 | Feuersaenger et al. |
| 9,660,791 B2 | 5/2017 | Kim et al. |
| 9,686,067 B2 | 6/2017 | Loehr et al. |
| 9,699,829 B2 | 7/2017 | Lee et al. |
| 9,717,113 B2 | 7/2017 | Xu |
| 9,723,618 B2 | 8/2017 | Loehr et al. |
| 9,801,232 B2 | 10/2017 | Deenoo et al. |
| 9,883,480 B2 | 1/2018 | Tabet et al. |
| 10,165,512 B2 | 12/2018 | Karri et al. |
| 10,278,207 B2 | 4/2019 | Lee et al. |
| 10,327,275 B2 | 6/2019 | Dalsgaard et al. |
| 10,334,447 B2 | 6/2019 | Vajapeyam et al. |
| 10,349,466 B2 | 7/2019 | Agarwal et al. |
| 10,404,418 B2 | 9/2019 | Wu |
| 10,455,503 B2 | 10/2019 | Lee et al. |
| 10,512,102 B2 | 12/2019 | Lunden et al. |
| 2009/0168731 A1 | 7/2009 | Zhang et al. |
| 2011/0002281 A1 | 1/2011 | Terry et al. |
| 2014/0029459 A1 | 1/2014 | Kwon et al. |
| 2014/0071954 A1 | 3/2014 | Au et al. |
| 2014/0112271 A1 | 4/2014 | Pan |
| 2014/0254451 A1 | 9/2014 | Jamadagni et al. |
| 2016/0119969 A1 | 4/2016 | Vajapeyam et al. |
| 2016/0255676 A1 | 9/2016 | Vajapeyam et al. |
| 2016/0269996 A1 | 9/2016 | Wu et al. |
| 2017/0034781 A1 | 2/2017 | Kumar et al. |
| 2017/0325164 A1 | 11/2017 | Lee et al. |
| 2017/0359850 A1* | 12/2017 | Loehr ................ H04W 72/042 |
| 2017/0373803 A1* | 12/2017 | Wu ....................... H04W 72/14 |
| 2018/0014322 A1* | 1/2018 | Loehr ............... H04W 52/0206 |
| 2018/0049271 A1* | 2/2018 | Bagheri .............. H04L 27/2601 |
| 2018/0139772 A1 | 5/2018 | Ozturk et al. |

OTHER PUBLICATIONS

International Search Report and Written Opinion—PCT/US2017/060994—ISA/EPO—dated Feb. 15, 2018.

ZTE: "Utilization of Short TTI in Higher Layer", 3GPP Draft; R2-154172, 3rd Generation Partnership Project (3GPP), Mobile Competence Centre; 650, Route Des Lucioles; F-06921 Sophia-Anti Polis Cedex; France, vol. RAN WG2, No. Malmo, Sweden; Sep. 25, 2015, XP051023493, Retrieved from the Internet: URL:http://www.3gpp.org/ftp/tsg_ran/WG2_RL2/TSGR2_91bis/Docs/ [retrieved on Sep. 25, 2015], 3 pages.

* cited by examiner

DISCONTINUOUS RECEPTION AND SCHEDULING TECHNIQUES IN WIRELESS COMMUNICATION SYSTEMS USING MULTIPLE TRANSMISSION TIME INTERVALS

CROSS REFERENCES

The present Application for Patent is a Divisional of U.S. Pat. No. 10,779,312 by Ozturk et al., entitled, "Discontinuous Reception and Scheduling Techniques in Wireless Communication Systems Using Multiple Transmission Time Intervals" filed Nov. 9, 2017, which claims the benefit of U.S. Provisional Patent Application No. 62/420,867 by Ozturk et al., entitled "Discontinuous Reception and Scheduling Techniques In Wireless Communication Systems Using Multiple Transmission Time Intervals," filed Nov. 11, 2016, each of which is incorporated by reference herein and is assigned to the assignee hereof.

BACKGROUND

The following relates generally to wireless communication, and more specifically to discontinuous reception and scheduling techniques in wireless communication systems using multiple transmission time intervals .

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using multiple different transmission time intervals (TTIs) that may include a shortened TTI (sTTI) that has a reduced length relative to a 1 millisecond (1 ms) or legacy LTE TTI. Users communicating using sTTIs may be referred to as low latency users. An sTTI may be a subset of one or more subframes that correspond to 1 ms or legacy TTI subframes. A base station may allocate transmission resources for sTTIs to a UE that may include time and/or frequency resources. In some cases, UEs may operate in a discontinuous reception (DRX) mode in which one or more radio components of the UE may be powered-down to conserve power. In some cases, it may be desirable to utilize DRX and provide the capability for communications using different TTI lengths.

SUMMARY

The described techniques relate to improved methods, systems, devices, or apparatuses that support discontinuous reception (DRX) and scheduling techniques in wireless communication systems using multiple transmission time intervals (TTIs). Generally, the described techniques provide for communications using multiple TTIs, on one or multiple component carriers, while in a configured DRX mode that allows efficient scheduling and allocation of resources as well as relatively efficient power usage at a user equipment (UE). In some cases, two or more available TTIs for transmissions between a base station and a UE may be identified, and a DRX cycle configured based at least in part on the available TTIs.

In some examples, a first TTI may be longer than a second TTI, and the DRX cycle may be configured based on the first TTI and the UE may be configured to monitor for control signals associated with the second TTI based on the DRX cycle. In other examples, the first TTI may be shorter than the second TTI, and the DRX cycle may be configured based on the first TTI and the UE may be configured to monitor for control signals associated with the first TTI based on the DRX cycle. In some cases, resources for the shorter TTI may be allocated using a two-stage grant and/or multiple component carriers may be configured for one or more different TTIs. In such cases, the UE may be configured to monitor for grant information based on a DRX configuration, and may optionally receive grant information for a second component carrier via a first component carrier.

A method of wireless communication is described. The method may include identifying two or more available TTIs for transmissions between a base station and a UE, configuring a DRX cycle based at least in part on the two or more available TTIs, and monitoring for a control signal based at least in part on the configured DRX cycle.

An apparatus for wireless communication is described. The apparatus may include means for identifying two or more available TTIs for transmissions between a base station and a UE, means for configuring a DRX cycle based at least in part on the two or more available TTIs, and means for monitoring for a control signal based at least in part on the configured DRX cycle.

Another apparatus for wireless communication is described. The apparatus may include a processor, memory in electronic communication with the processor, and instructions stored in the memory. The instructions may be operable to cause the processor to identify two or more available TTIs for transmissions between a base station and a UE, configure a DRX cycle based at least in part on the two or more available TTIs, and monitor for a control signal based at least in part on the configured DRX cycle.

A non-transitory computer readable medium for wireless communication is described. The non-transitory computer-readable medium may include instructions operable to cause a processor to identify two or more available TTIs for transmissions between a base station and a UE, configure a DRX cycle based at least in part on the two or more available TTIs, and monitor for a control signal based at least in part on the configured DRX cycle.

In some examples of the method, apparatus, and non-transitory computer-readable medium described above, the configuring the DRX cycle further comprises configuring the DRX cycle for a first TTI that may be longer than a second TTI, and configuring monitoring of a second control signal associated with the second TTI during active durations of the DRX cycle for the first TTI. Some examples of the method, apparatus, and non-transitory computer-readable medium described above may further include processes, features, means, or instructions for determining that the second control signal may be received, and resetting an inactivity timer associated with the DRX cycle responsive to determining that the second control signal may be received.

Some examples of the method, apparatus, and non-transitory computer-readable medium described above may further include processes, features, means, or instructions for determining that the second control signal is received and includes a first portion of a two-stage grant of resources for a wireless transmission using the second TTI, identifying one or more time windows for receiving a second portion of the two-stage grant of resources, and monitoring for the second portion of the two-stage grant of resources during the one or more time windows. Some examples of the method, apparatus, and non-transitory computer-readable medium described above may further include processes, features, means, or instructions for transitioning into a non-downlink-monitoring state prior to at least one of the one or more time windows.

In some examples of the method, apparatus, and non-transitory computer-readable medium described above, the configuring the DRX cycle further comprises configuring the DRX cycle for a first TTI that is shorter than a second TTI, and wherein the monitoring for the control signal comprises monitoring for a first control signal associated with the first TTI and monitoring for a second control signal associated with the second TTI during monitoring durations of the DRX cycle.

Some examples of the method, apparatus, and non-transitory computer-readable medium described above may further include processes, features, means, or instructions for determining that the second control signal is received and resetting an inactivity timer associated with the DRX cycle responsive to determining that the second control signal is received. Some examples of the method, apparatus, and non-transitory computer-readable medium described above may further include processes, features, means, or instructions for monitoring for a third control signal associated with the first TTI, the first control signal including a second portion of a two-stage grant of resources associated with the first TTI and the third control signal including a first portion of the two-stage grant of resources associated with the first TTI. Some examples of the method, apparatus, and non-transitory computer-readable medium described above may further include processes, features, means, or instructions for receiving, via radio resource control (RRC) signaling, configuration information that indicates a location of resources to be monitored for the third control signal.

In some examples of the method, apparatus, and non-transitory computer-readable medium described above, the configuring the DRX cycle further comprises configuring a first DRX cycle for a first TTI duration that is shorter than a second TTI duration, and configuring a second DRX cycle for the second TTI duration that is independent of the first DRX cycle.

Some examples of the method, apparatus, and non-transitory computer-readable medium described above may further include processes, features, means, or instructions for identifying two or more component carriers for transmissions between the base station and the UE including a first component carrier that has a first TTI and a second component carrier that has a second TTI that is shorter than the first TTI, and wherein the configuring the DRX cycle further comprises configuring a first DRX cycle for the first component carrier and configuring a second DRX cycle for the second component carrier that is independent of the first DRX cycle.

Some examples of the method, apparatus, and non-transitory computer-readable medium described above may further include processes, features, means, or instructions for identifying two or more component carriers for transmissions between the base station and the UE including a first component carrier that has a first TTI and a second component carrier that has a second TTI that is shorter than the first TTI, and wherein the configuring the DRX cycle further comprises configuring the DRX cycle for the first TTI and monitoring of a second control signal associated with the second component carrier during monitoring durations of the DRX cycle for the first TTI.

Some examples of the method, apparatus, and non-transitory computer-readable medium described above may further include processes, features, means, or instructions for identifying two or more component carriers for transmissions between the base station and the UE including a first component carrier and a second component carrier, monitoring the first component carrier for a first portion of a grant of resources associated with the second component carrier, and monitoring the second component carrier for a second portion of the grant of resources associated responsive to identifying the first portion of the grant of resources. In some examples of the method, apparatus, and non-transitory computer-readable medium described above, the first portion of the grant of resources includes common information for a plurality of component carriers.

A method of wireless communication is described. The method may include identifying, at a base station, two or more available TTIs for transmissions between the base station and a UE, identifying a DRX cycle configuration for the UE based at least in part on the two or more available TTIs, and transmitting the DRX cycle configuration to the UE.

An apparatus for wireless communication is described. The apparatus may include means for identifying, at a base station, two or more available TTIs for transmissions between the base station and a UE, means for identifying a DRX cycle configuration for the UE based at least in part on the two or more available TTIs, and means for transmitting the DRX cycle configuration to the UE.

Another apparatus for wireless communication is described. The apparatus may include a processor, memory in electronic communication with the processor, and instructions stored in the memory. The instructions may be operable to cause the processor to identify, at a base station, two or more available TTIs for transmissions between the base station and a UE, identify a DRX cycle configuration for the UE based at least in part on the two or more available TTIs, and transmit the DRX cycle configuration to the UE.

A non-transitory computer readable medium for wireless communication is described. The non-transitory computer-readable medium may include instructions operable to cause a processor to identify, at a base station, two or more available TTIs for transmissions between the base station and a UE, identify a DRX cycle configuration for the UE based at least in part on the two or more available TTIs, and transmit the DRX cycle configuration to the UE.

In some examples of the method, apparatus, and non-transitory computer-readable medium described above, the identifying the DRX cycle configuration further comprises configuring the DRX cycle for a first TTI that is longer than a second TTI, and configuring the UE to monitor for a second control signal associated with the second TTI during monitoring durations of the DRX cycle for the first TTI. Some examples of the method, apparatus, and non-transitory computer-readable medium described above may further include processes, features, means, or instructions for configuring the UE to reset an inactivity timer associated with the DRX cycle responsive to determining that the second control signal is received.

Some examples of the method, apparatus, and non-transitory computer-readable medium described above may further include processes, features, means, or instructions for identifying that the UE is to receive a two-stage resource grant for a grant of resources for a wireless transmission using the second TTI, configuring the UE to monitor for a first portion of the two-stage resource grant during monitoring durations of the DRX cycle for the first TTI, and configuring one or more time windows for the UE to monitor for a second portion of the two-stage resource grant.

In some examples of the method, apparatus, and non-transitory computer-readable medium described above, the identifying the DRX cycle configuration further comprises configuring the DRX cycle for a first TTI that is shorter than a second TTI, and configuring the UE to monitor for a first control signal associated with the first TTI and to monitor for a second control signal associated with the second TTI during monitoring durations of the DRX cycle.

Some examples of the method, apparatus, and non-transitory computer-readable medium described above may further include processes, features, means, or instructions for identifying that the UE is to receive a two-stage resource grant for a grant of resources for a wireless transmission using the first TTI. Some examples of the method, apparatus, and non-transitory computer-readable medium described above may further include processes, features, means, or instructions for configuring the UE to monitor for a third control signal associated with the first TTI, the third control signal including a first portion of the two-stage resource grant and the first control signal including a second portion of the two-stage resource grant. Some examples of the method, apparatus, and non-transitory computer-readable medium described above may further include processes, features, means, or instructions for transmitting RRC signaling to the UE that indicates a location of resources to be monitored for the third control signal.

In some examples of the method, apparatus, and non-transitory computer-readable medium described above, the identifying the DRX cycle configuration further comprises configuring a first DRX cycle for a first TTI duration that is shorter than a second TTI duration, and configuring a second DRX cycle for the second TTI duration that is independent of the first DRX cycle.

Some examples of the method, apparatus, and non-transitory computer-readable medium described above may further include processes, features, means, or instructions for identifying two or more component carriers for transmissions between the base station and the UE including a first component carrier that has a first TTI and a second component carrier that has a second TTI that is shorter than the first TTI, and wherein the identifying the DRX cycle configuration further comprises configuring a first DRX cycle for the first component carrier and configuring a second DRX cycle for the second component carrier that is independent of the first DRX cycle.

Some examples of the method, apparatus, and non-transitory computer-readable medium described above may further include processes, features, means, or instructions for identifying two or more component carriers for transmissions between the base station and the UE including a first component carrier that has a first TTI and a second component carrier that has a second TTI that is shorter than the first TTI, and wherein the identifying the DRX cycle configuration further comprises configuring the DRX cycle for the first TTI and monitoring of a second control signal associated with the second component carrier during monitoring durations of the DRX cycle for the first TTI.

Some examples of the method, apparatus, and non-transitory computer-readable medium described above may further include processes, features, means, or instructions for identifying two or more component carriers for transmissions between the base station and the UE including a first component carrier and a second component carrier, transmitting a first portion of a two-stage grant of resources associated with the second component carrier using the first component carrier, and transmitting a second portion of the two-stage grant of resources using the second component carrier. In some examples of the method, apparatus, and non-transitory computer-readable medium described above, the first portion of the grant of resources includes common information for a plurality of component carriers.

DETAILED DESCRIPTION

Figure 1:
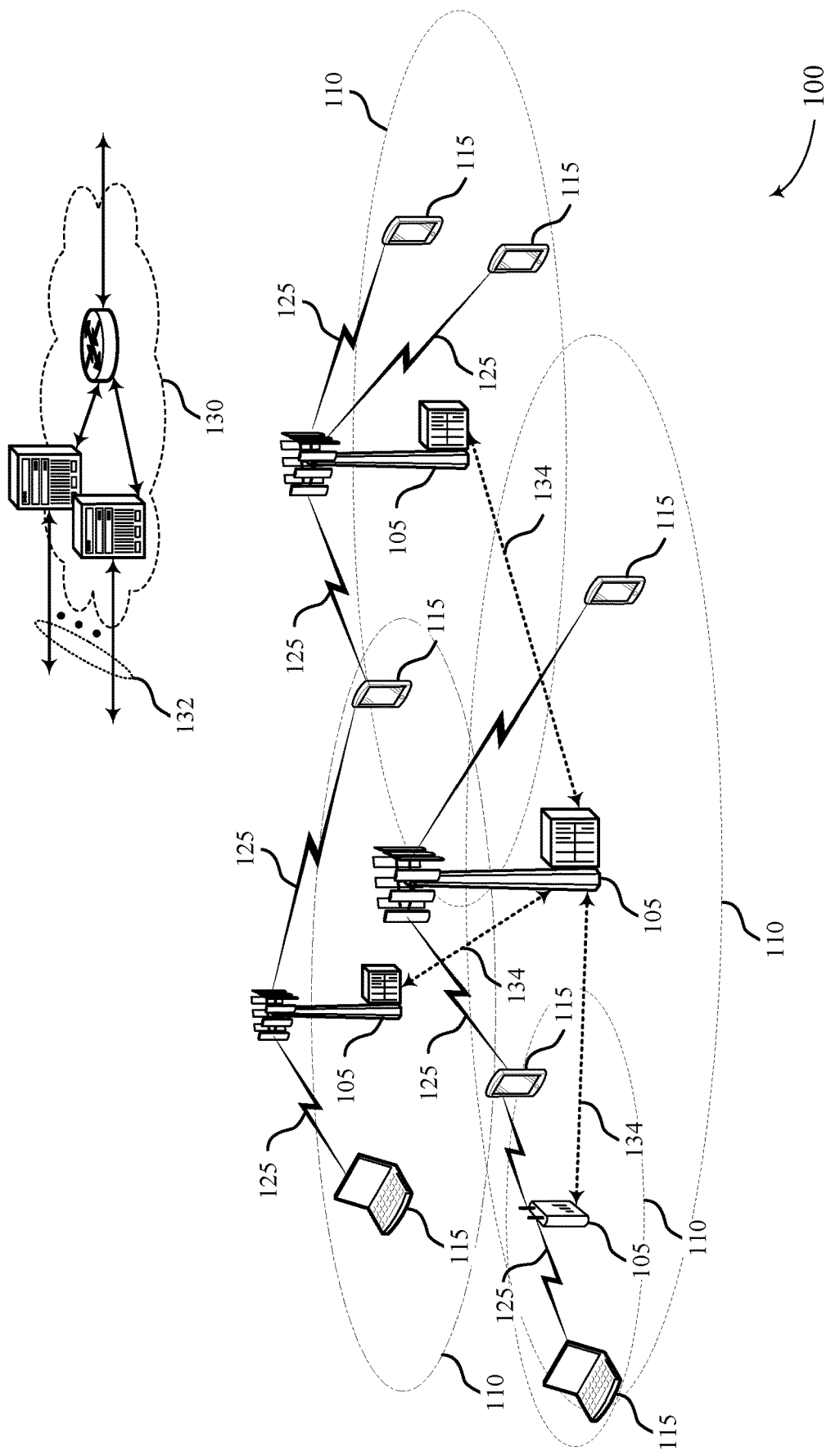
FIG. 1 illustrates an example of a system for wireless communication that supports discontinuous reception and scheduling techniques in wireless communication systems using multiple transmission time intervals (TTIs) in accordance with aspects of the present disclosure.

Improved methods, systems, devices, or apparatuses of various examples may be used to support discontinuous reception (DRX) and scheduling techniques in wireless communication systems using multiple transmission time intervals (TTIs). Resources allocated for low latency communication may be used for uplink and downlink communication using shortened TTIs (sTTIs) that have a reduced length relative to TTIs of communications that may be relatively latency insensitive, such as enhanced mobile broadband (eMBB) transmissions that may use a 1 ms TTI duration. Communications using sTTIs may use, in some cases, a sTTI duration that corresponds to one slot of a wireless subframe, or a sTTI duration that corresponds to two or three orthogonal frequency division multiplexing (OFDM) symbols. In some cases, sTTIs may be configured to have boundaries within or aligned with boundaries of a slot of a 1 ms TTI. In some examples, the sTTIs may span two or three OFDM symbols, and each slot may have three sTTIs. In such a manner, all seven symbols of a slot using a normal cyclic prefix may be utilized and system resources may be more efficiently utilized relative to a case where three two-symbol sTTIs would be included in a seven-symbol slot.

Various techniques as disclosed herein may provide for UE communications using multiple TTIs, on one or multiple component carriers, while in a configured DRX mode that allows efficient scheduling and allocation of resources as well as relatively efficient power usage at a UE. In some cases, two or more available TTIs for transmissions between a base station and a UE may be identified, and a DRX cycle may be configured based at least in part on the available TTIs. For example, a first TTI may be longer than a second TTI, the DRX cycle may be configured based on the first TTI, and the UE may be configured to monitor for control signals associated with both the first TTI and the second TTI based on the DRX cycle. In some cases, an inactivity timer associated with the DRX cycle may be reset in the event that a control signal associated with the second TTI is identified. In other examples, the first TTI may be shorter than the second TTI, the DRX cycle may be configured based on the first TTI, and the UE may be configured to monitor for control signals associated with the first TTI and the second TTI based on the DRX cycle. In other cases, separate DRX cycles may be maintained for each TTI.

In some cases, resources for the shorter TTI may be allocated using a two-stage grant, and the different stages of the two-stage grant may be monitored at the UE based on a DRX cycle, based on configured windows for portions of the two-stage grant, or combinations thereof. In some cases, a stage-0 grant of a two-stage grant may include semi-static information (e.g., MIMO rank, precoding information, etc.), and stage-1 of the two-stage grant may include dynamic information (e.g., UE identification, new data indication, modulation scheme, HARQ information, etc.). In some cases, the UE may be configured to monitor for stage-0 grant information during DRX cycles where the UE is to monitor for control signals (e.g., a physical downlink control channel (PDSCH) grant of resources) of a 1 ms TTI. In other cases, the UE may be configured to monitor for stage-0 grants separately, and may monitor for stage-1 grants according to a configured DRX cycle. In further examples, time windows for monitoring for a stage-1 grant may be configured at the UE, and the UE may transition to a non-downlink-monitoring state between the configured time windows in order to further reduce power consumption at the UE.

In some cases, UEs and base stations may communicate using multiple component carriers. One or more of the component carriers may support sTTI communications, either alone or in conjunction with 1 ms TTI communications. In such cases, a common DRX cycle may configured in which a UE may monitor for control signals of one or more component carriers during a DRX monitoring period. In some examples, a first component carrier may be used to schedule resources of one or more other component carriers, and a UE may be configured to monitor for control signals of the first component carrier, and then monitor the one or more other component carriers in the event that resources are scheduled on the one or more other component carriers. In some cases, the control signal of the first component carrier may be a stage-0 grant of a two-stage grant, and the UE may then monitor either the first of the one or more other component carriers for a stage-1 grant of the two-stage grant.

Such low latency communications may be used in system, for example, that may support multiple different services for data communications that may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses sTTIs. Correspondingly, communications that are more delay-tolerant may be served through a service that provides relatively higher throughput with somewhat higher latency, such as a mobile broadband service (e.g., an enhanced mobile broadband (eMBB) service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different cyclic prefixes.

Aspects of the disclosure are initially described in the context of a wireless communications system. Aspects of the disclosure are further illustrated by and described with reference to apparatus diagrams, system diagrams, and flowcharts that relate to discontinuous reception and scheduling techniques in wireless communication systems using multiple transmission time intervals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (e.g., MiCr or URLLC) communications, low latency communications, and communications with low-cost and low-complexity devices. The UEs 115, in some cases, may be configured with DRX cycles and may monitor for control signals associated with communications that use two or more different TTIs over one or more component carriers. The DRX cycles may be configured to be a common DRX cycle across the two or more TTIs during which control signals associated with the different TTI communications may be monitored.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, a drone, or the like.

In some cases, a UE 115 may also be able to communicate directly with other UEs (e.g., using a peer-to-peer (P2P) or device-to-device (D2D) protocol). Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable and low latency communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may be an example of a LTE eNB, an eLTE eNB, an NR gNB, an NR Node-B, an NR access node, and may include an access node controller (ANC).

A base station 105 may interface with the core network 130 through backhaul links 132 (e.g., S1, S2, NG-1, NG-2, NG-3, NG-C, NG-U etc.) and may perform radio configuration and scheduling for communication with the UEs 115 within an associated coverage area 110. In various examples, the network devices 105-b may communicate, either directly or indirectly (e.g., through core network 130), with each other over backhaul links 134 (e.g., X1, X2, Xn etc.), which may be wired or wireless communication links. Each base station 105 may also communicate with a number of UEs 115 through a number of other network devices, where a network device may be an example of a transmission reception point (TRP), a distributed unit (DU), a radio head (RH), a remote radio head (RRH), or a smart radio head.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, and shorter transmission time interval (TTIs). In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Time intervals in LTE or NR may be expressed in multiples of a basic time unit and may be organized according to radio frames of length of 10 ms that may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). In some cases the subframe may be the smallest scheduling unit, also known as a TTI. In other cases, a TTI may be shorter than a subframe or may be dynamically selected (e.g., in sTTI bursts or in selected component carriers using sTTIs). Various examples discussed herein provide for UE 115 communications using multiple TTIs, including 1 ms TTIs and sTTIs, on one or multiple component carriers while in a configured DRX mode. Such techniques may allow for efficient scheduling and allocation of resources as well as relatively efficient power usage at a UE 115.

Figure 2:
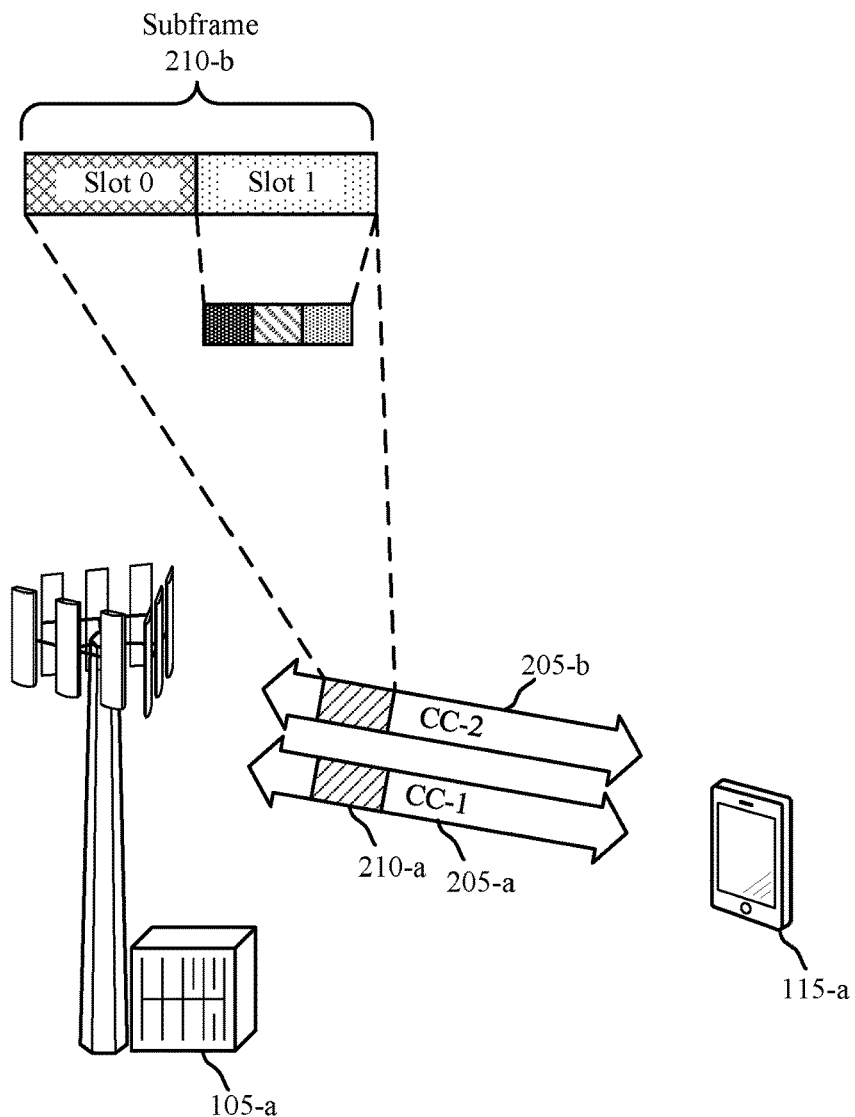
FIG. 2 illustrates an example of a wireless communication system that supports discontinuous reception and scheduling techniques in wireless communication systems using multiple TTIs in accordance with aspects of the present disclosure.
Figure 2:
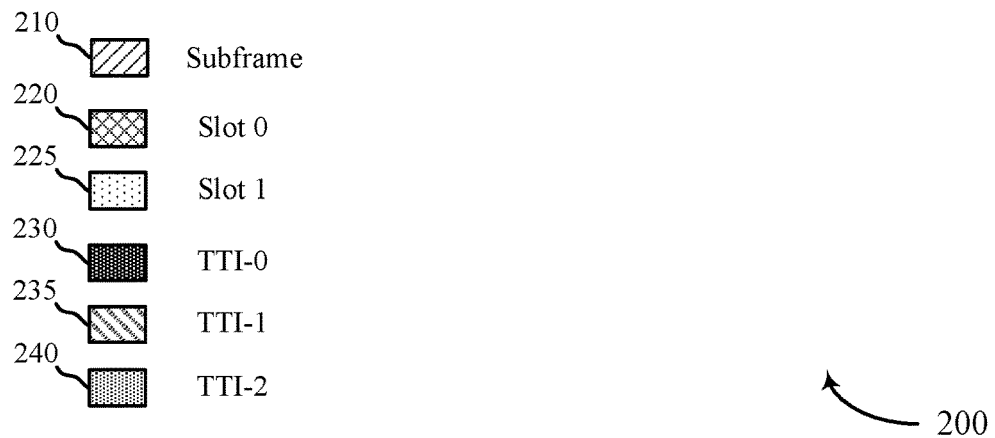

FIG. 2 illustrates an example of a wireless communications system 200 for discontinuous reception and scheduling techniques in wireless communication systems using multiple transmission time intervals. Wireless communications system 200 includes base station 105-a and UE 115-a, which may be examples of aspects of a UE 115 as described above with reference to FIG. 1. In the example of FIG. 2, the wireless communications system 200 may operate according to a radio access technology (RAT) such as a 5G or NR RAT that may employ multiple different TTIs, although techniques described herein may be applied to any RAT and to systems that may concurrently use two or more different RATs.

Base station 105-a may communicate with UE 115-a over carrier 205. In some examples, base station 105-a may allocate resources for communication with UEs over two or more component carriers 205, including a first component carrier 205-a and a second component carrier 205-b. Base station 105-a may allocate subframes 210 for communication with UE 115-a, and one or more subframes 210, in some examples, may correspond to a legacy LTE TTI (having a 1 ms duration) or a 5G or NR 1 ms TTI. In this example, subframes 210 may include a first subframe 210-a transmitted on the first component carrier 205-a, and a second subframe 210-b transmitted on the second component carrier 205-b. Each of the subframes 210 may include two slots, in which each slot may have seven symbols for a normal cyclic prefix. In this example, a first slot (slot 0) 220 and a second slot (slot 1) 225 may be included in the second subframe 210-b.

As indicated above, in the uplink of a low latency system, different sTTI lengths may be used for transmissions over carriers 205. For example, two-symbol sTTI, three-symbol sTTI, and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 220 or second slot 225, there may be multiple sTTIs, such as a first sTTI (TTI-0) 230, a second sTTI (TTI-1) 235, and a third sTTI (TTI-2) 240, that may each have a two or three OFDM symbol duration. While various examples discussed herein are described with respect to uplink communications, such techniques may also apply to downlink communications in some examples.

The UE 115-a may, in some cases, concurrently support multiple TTI lengths, such as 1 ms TTIs and sTTIs, and in some cases, the UE 115-a can be scheduled with either or both of them at the same time. Additionally, for sTTI grants of uplink resources to the UE 115-a, a two-stage grant procedure may be implemented, in which static or semi-static information may be provided in a first grant, or stage-0 grant, that may be provided to one or multiple UEs 115. Following the first grant, a second grant, or stage-1 grant, may be provided to UE 115-a that includes dynamic information specific to a particular uplink grant. Furthermore, in some cases cross-carrier scheduling may be implemented, in which one component carrier, such as first component carrier 205-a, may provide uplink grant information for one or more other component carriers, such as second component carrier 205-b. In order to provide efficient grants of uplink resources, as well as allow the UE 115-a to perform DRX to help reduce power usage, various techniques provided herein provide DRX and scheduling techniques for such situations.

Figure 3:
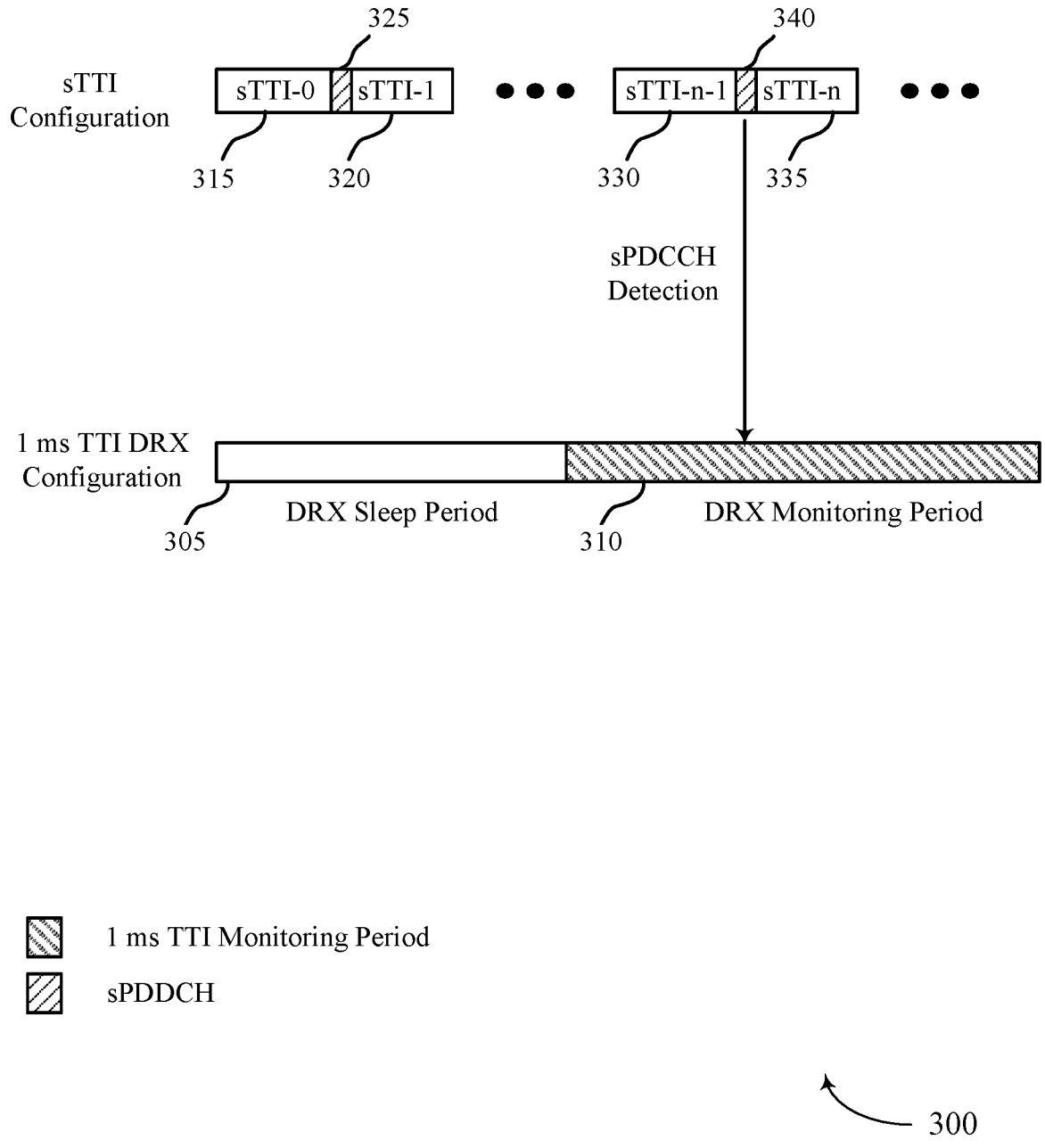
FIG. 3 illustrates an example of different transmission time intervals (TTIs) and discontinuous reception and scheduling techniques for the different TTIs in accordance with aspects of the present disclosure.

FIG. 3 illustrates an example 300 of different transmission time intervals (TTIs) and discontinuous reception and scheduling techniques for the different TTIs in accordance with aspects of the present disclosure. The techniques of example 300 may be used, for example, in multiple TTI communications between a UE and a base station such as discussed above with respect to FIGS. 1 and 2.

In this example, a UE may be configured with a 1 ms TTI DRX configuration, in which the UE may enter a DRX sleep period 305 followed by a DRX monitoring period 310. During the DRX monitoring period, the UE may monitor for control signals (e.g., PDCCH transmissions) according to established DRX techniques. Additionally, during the DRX monitoring period 310, the UE may also monitor for control signals associated with a different TTI than the 1 ms TTI DRX configuration, such as control signals associated with sTTI transmissions. In this example, the UE may be configured to communicate using sTTIs, which may include transmissions over sTTI-0 315, sTTI-1 320, sTTI-n-1 330, and sTTI-n 335. Information related to uplink grants for sTTI transmissions may be included in, for example, sPDCCH transmissions 325 and 340. In this example, sPDCCH transmission 325 occurs during DRX sleep period 305, and would not be received at the UE, and sPDCCH transmission 340 occurs during DRX monitoring period 310 during which the UE is configured to monitor for both PDCCH transmissions of the 1 ms TTI and sPDCCH transmissions of the sTTI. Thus, the UE may detect the sPDCCH transmission 340, and may determine, for example, allocated sTTI resources for a subsequent uplink transmission.

In some examples, the 1 ms TTI DRX configuration may be configured with DRX timers that are established based on the 1 ms TTI transmissions. In some examples, one or more of such DRX timers, such as an inactivity timer, may be reset when the UE detects the sPDCCH transmission 340. In such a manner, the UE may receive the sPDCCH or other control signals (e.g., a second grant of a two-stage grant transmission) that may in some cases have otherwise occurred after the expiration of the inactivity timer and after transition of the UE to a DRX sleep, or non-downlink-monitoring state.

Figure 4:
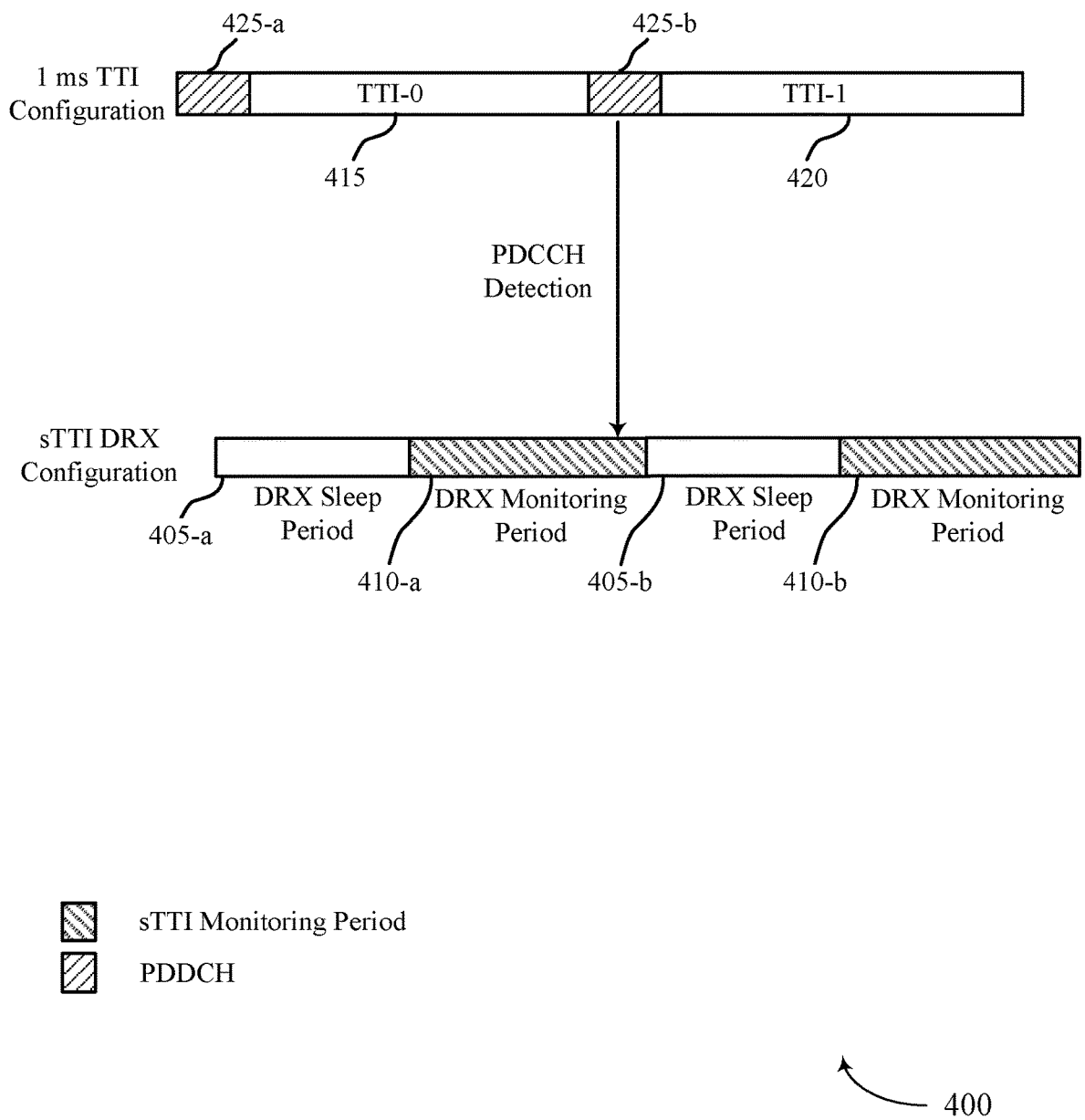
FIG. 4 illustrates another example of different TTIs and discontinuous reception and scheduling techniques for the different TTIs in accordance with aspects of the present disclosure.

FIG. 4 illustrates an example 400 of different transmission time intervals (TTIs) and discontinuous reception and scheduling techniques for the different TTIs in accordance with aspects of the present disclosure. The techniques of example 400 may be used, for example, in multiple TTI communications between a UE and a base station such as discussed above with respect to FIGS. 1 and 2.

In this example, a UE may be configured with a sTTI DRX configuration, in which the UE may enter a first DRX sleep period 405-a followed by a first DRX monitoring period 410-a, followed by a second DRX sleep period 405-b and a second DRX monitoring period 410-b. During the DRX monitoring period, the UE may monitor for control signals (e.g., sPDCCH transmissions) associated with sTTI transmissions according to established DRX techniques. Additionally, during the DRX monitoring periods 410, the UE may also monitor for control signals associated with a different TTI than the sTTI DRX configuration, such as control signals associated with 1 ms TTI transmissions. In this example, the UE may be configured to communicate using 1 ms TTIs, which may include transmissions over TTI-0 415, and TTI-1 420. Information related to uplink grants for 1 ms TTI transmissions may be included in, for example, PDCCH transmissions 425-a and 425-b. In this example, a first PDCCH transmission 425-a occurs during first DRX sleep period 405-a, and would not be received at the UE, and second PDCCH transmission 425-b occurs during the first DRX monitoring period 410-a during which the UE is configured to monitor for both PDCCH transmissions of the 1 ms TTI and sPDCCH transmissions of the sTTI. Thus, the UE may detect the second PDCCH transmission 425-b, and may determine, for example, allocated 1 ms TTI resources for a subsequent uplink transmission.

In some examples, the sTTI DRX configuration may be configured with DRX timers that are established based on the sTTI transmissions. In some examples, one or more of such DRX timers, such as an inactivity timer, may be reset when the UE detects the second PDCCH transmission 425-b. In such a manner, the UE may receive the PDCCH or other control signals that may in some cases have otherwise occurred after the expiration of the inactivity timer and after transition of the UE to a DRX sleep, or non-downlink-monitoring state. In still further examples, multiple independent DRX processes may be established for each supported TTI. For example, a UE may configure a first DRX cycle for a TTI (e.g., a 1 ms TTI) or a first component carrier, and may configure a second DRX cycle for a second TTI (e.g., a sTTI) or a second component carrier that is independent of the first DRX cycle. In such cases, separate DRX state machines may be established for the different DRX cycles.

Figure 5:
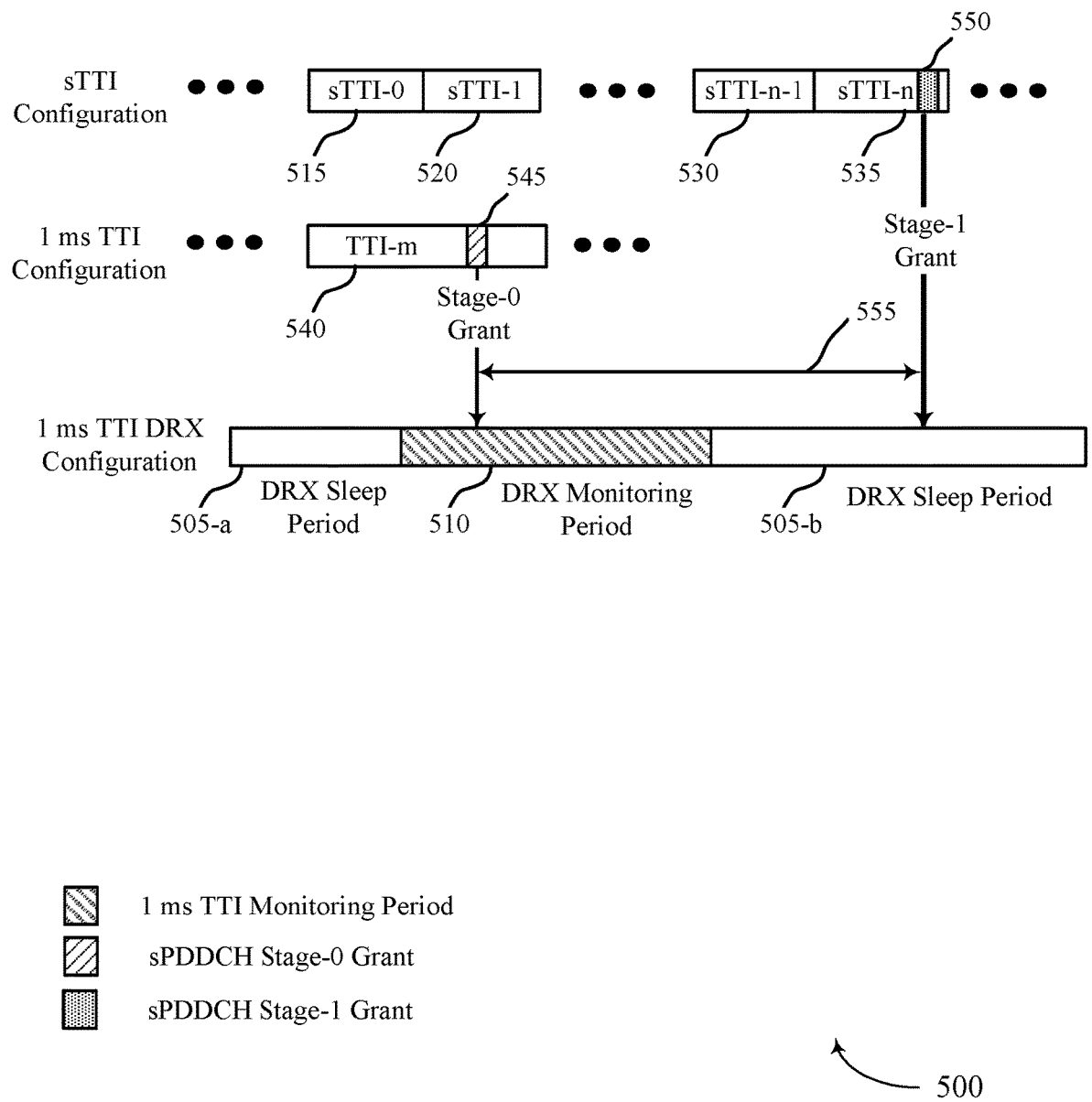
FIG. 5 illustrates an example of two-stage grants and discontinuous reception and scheduling techniques for different TTIs in accordance with aspects of the present disclosure.

FIG. 5 illustrates an example 500 of different TTIs and discontinuous reception and scheduling techniques for the different TTIs in accordance with aspects of the present disclosure. The techniques of example 500 may be used, for example, in multiple TTI communications between a UE and a base station such as discussed above with respect to FIGS. 1 and 2.

In this example, a UE may be configured with a 1 ms TTI DRX configuration, in which the UE may enter a first DRX sleep period 505-a followed by a DRX monitoring period 510, followed by a second DRX sleep period 505-b. During the DRX monitoring period, the UE may monitor for control signals (e.g., PDCCH transmissions) associated with 1 ms TTI transmissions according to established DRX techniques. Additionally, during the DRX monitoring period 510, the UE may also monitor for control signals associated with a different TTI than the 1 ms TTI DRX configuration, such as control signals associated with sTTI transmissions. In this example, the UE may be configured to communicate using sTTIs, which may include transmissions over sTTI-0 515, sTTI-1 520, sTTI-n-1 530, and sTTI-n 545. The UE also may be configured to communicate using 1 ms TTIs, which may include transmissions over TTI-m 540. Information related to uplink grants for sTTI transmissions 515 through 535 may, in this example, be provided in two stages, in which a stage-0 grant 545 is scheduled on legacy or 1 ms TTI PDCCH in TTI-m 540 and used to provide semi-static information for multiple uplink grants. In some cases, the stage-0 grant 545 may be provided on a per UE basis, or for a group of UEs. A stage-1 grant 550 may be scheduled on sPDCCH and used for dynamic and detailed information (e.g. resources, MCS). The stage-1 grant 550 may be a per UE grant, and in some cases may be configured for transmission in identified periodic time window 555 following the stage-0 grant 545.

In this example, stage-0 grant 545 may be detected during DRX monitoring period 510, and the UE may determine that the stage-1 grant 550 is to occur following time window 555. Additionally, the stage-0 grant 545 may serve as an activation for the stage-1 grant 550. In such examples, the UE may transition to non-downlink-monitoring, or micro-sleep, mode in which one or more radio components of the UE may be powered down in order to conserve power. The UE may monitor for the stage-1 grant 550 for a certain time period following the stage-0 grant 545, and if no grant is detected the UE may transition back to the non-downlink-monitoring state until a subsequent time window. In this example, the UE may be configured for 1 ms TTI DRX cycles. In some examples, a base station may configure, such as through RRC signaling, the subframe locations when sPDCCH for the stage-1 grant 550 can be received after detection of the stage-0 grant 545. This allows the UE to transition to the non-downlink-monitoring state until the first stage-1 grant 550 and between subsequent stage-1 locations. In some examples, the stage-0 grant 545 may be a broadcast grant provided to multiple UEs. In other examples, the stage-0 grant 545 may be a per UE (unicast) grant, in which cases, the UE may monitor all locations for sPDCCH during DRX monitoring periods 510.

Figure 6:
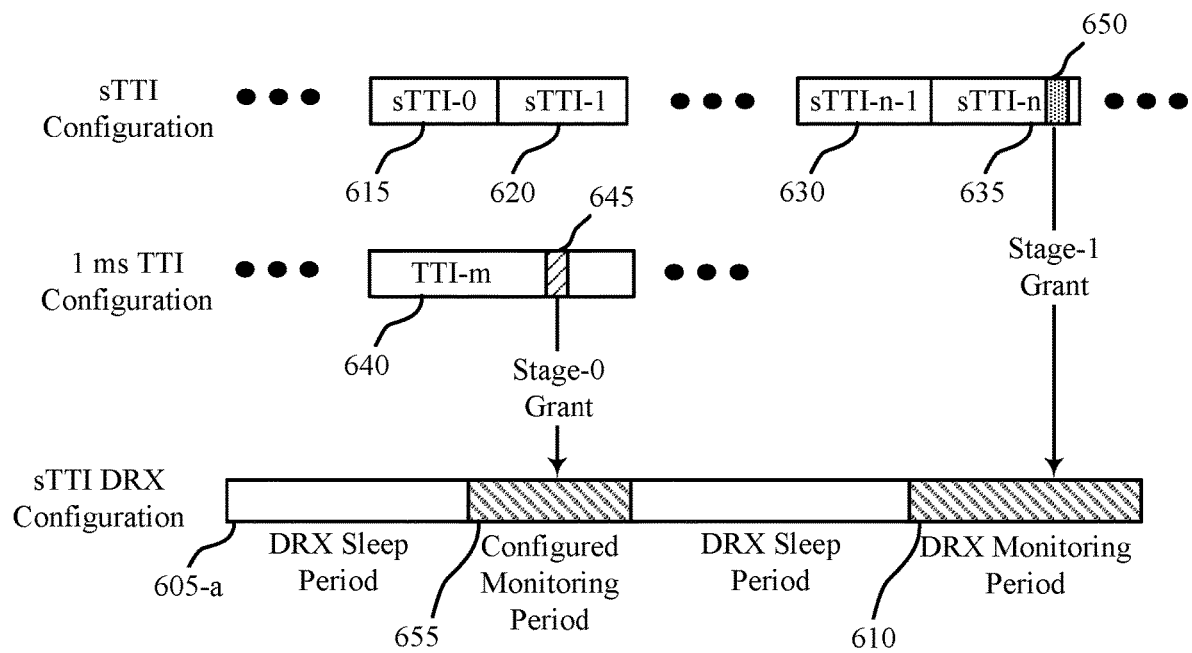
FIG. 6 illustrates another example of two-stage grants and discontinuous reception and scheduling techniques for different TTIs in accordance with aspects of the present disclosure.

FIG. 6 illustrates an example 600 of different TTIs and discontinuous reception and scheduling techniques for the different TTIs in accordance with aspects of the present disclosure. The techniques of example 600 may be used, for example, in multiple TTI communications between a UE and a base station such as discussed above with respect to FIGS. 1 and 2.

In this example, a UE may be configured with a sTTI DRX configuration, in which the UE may enter a DRX sleep period 605 followed by a DRX monitoring period 610. The UE, in this example, may be configured to monitor a PDCCH transmission of a 1 ms TTI, TTI-m 640, for a stage-0 grant 645 during a configured monitoring period 655. Such a configured monitoring period 655 may be configured, for example, via RRC signaling, and the UE may monitor such transmissions similarly as monitoring for paging transmissions. During the DRX monitoring period, the UE may monitor for control signals in sPDCCH 650 associated with sTTI transmissions for a stage-1 grant, according to established DRX techniques. Additionally, during the DRX monitoring period 610, the UE may also monitor for control signals associated with a different TTI than the sTTI DRX configuration, such as control signals associated with the 1 ms TTI transmissions. In this example, the UE may be configured to communicate using sTTIs, which may include transmissions over sTTI-0 615, sTTI-1 620, sTTI-n-1 630, and sTTI-n 645. In some cases, the stage-0 grant 645 may be provided on a per UE basis, or for a group of UEs. A stage-1 grant 650 may be scheduled on sPDCCH and used for dynamic and detailed information (e.g. resources, MCS).

Figure 7:
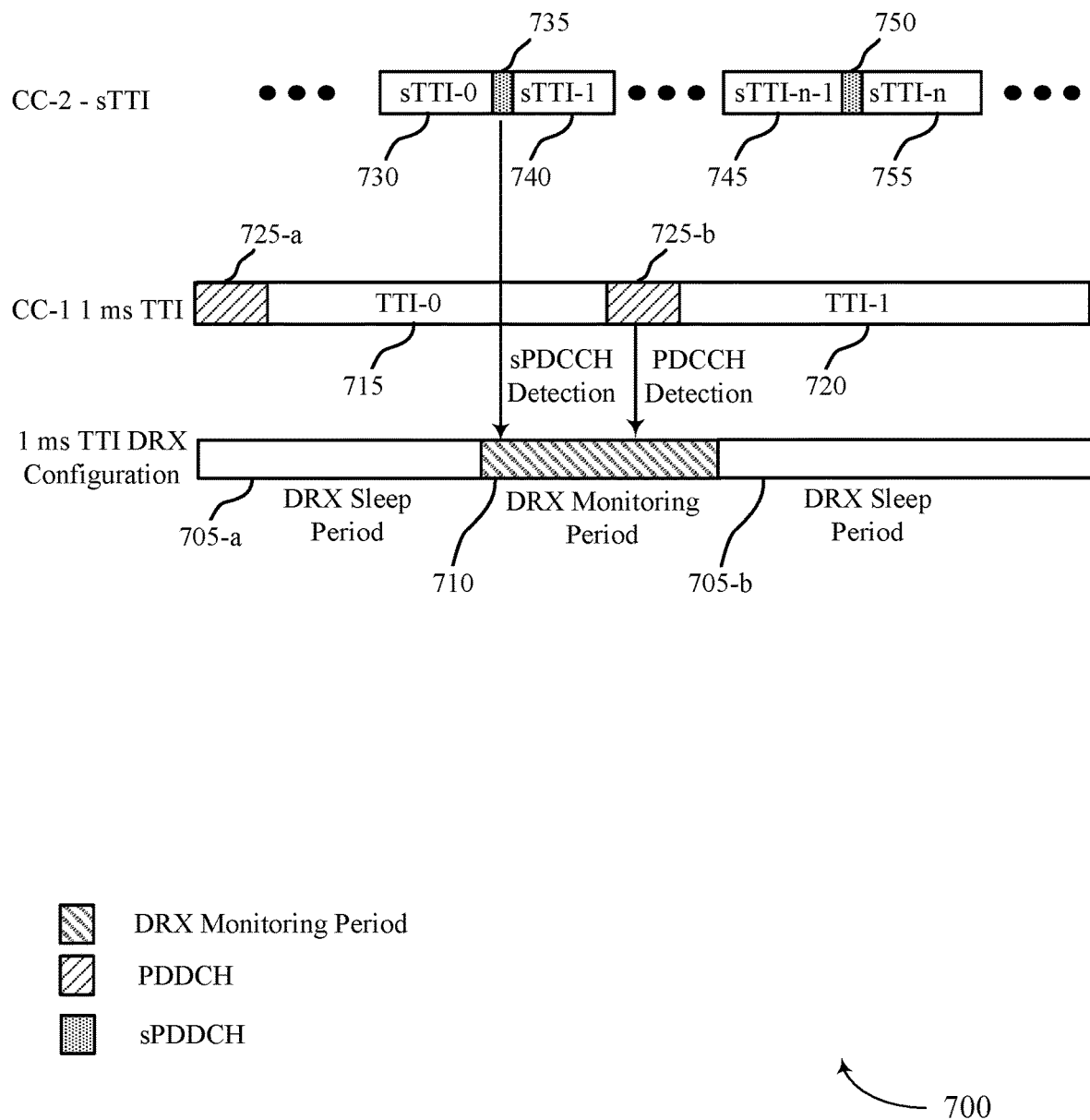
FIG. 7 illustrates another example of two-stage grants and discontinuous reception and scheduling techniques for different TTIs in accordance with aspects of the present disclosure.

FIG. 7 illustrates an example of multiple component carriers 700 that support discontinuous reception and scheduling techniques in wireless communication systems using multiple TTIs in accordance with various aspects of the disclosure. The techniques of example FIG. 7 may be used, for example, in multiple TTI communications between a UE and a base station such as discussed above with respect to FIGS. 1 and 2.

In this example, a UE may be configured with a 1 ms TTI DRX configuration, in which the UE may enter a first DRX sleep period 705-*a* followed by a DRX monitoring period 710. The UE, in this example, may be configured to monitor PDCCH transmission of a first component carrier, CC-1, which may use 1 ms TTIs and that may include TTI-0 715 and TTI-1 720. The UE, in this example, also may be configured to monitor sPDCCH transmission of a second component carrier, CC-2, which may use sTTIs and that may include sTTI-0 730, sTTI-1 740, sTTI-2 745, and sTTI-3 755. PDCCH transmissions 725 may be transmitted on the first component carrier CC-1, and sPDCCH transmissions 735 and 750 may be transmitted on the second component carrier CC-2. During the DRX monitoring period 710, the UE may monitor for control signals in PDCCH 725 and sPDCCH 735.

In such a manner, a common DRX configuration may be provided for each component carrier in which control signals for multiple different TTIs may be monitored in a similar manner as discussed above. In some cases, a UE may restart the common DRX timers when sPDCCH is scheduled on any of the carriers. In other examples, individual DRX state machines may be configured for each carrier.

Figure 8:
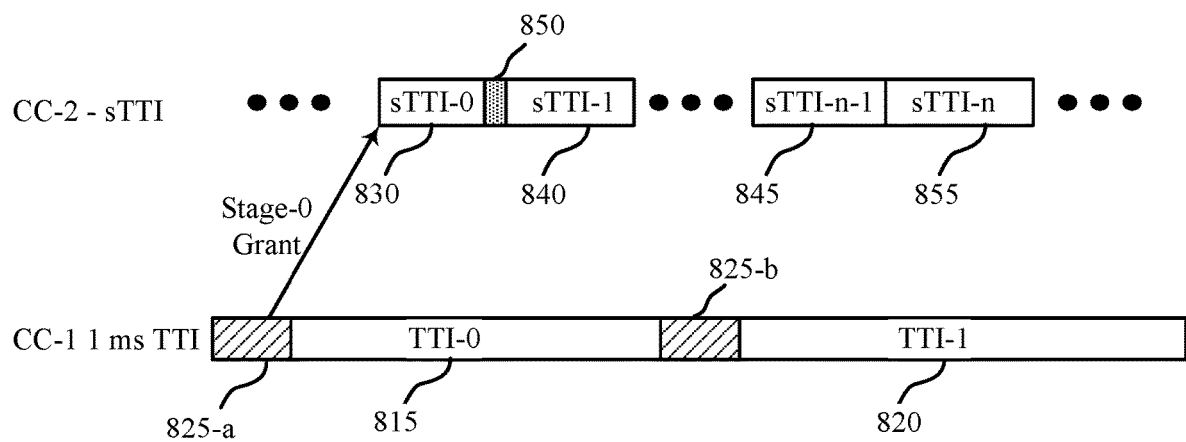
FIG. 8 illustrates another example of discontinuous reception and scheduling techniques in wireless communication systems using multiple TTIs and carrier aggregation in accordance with aspects of the present disclosure.

FIG. 8 illustrates an example of a component carriers 800 that provide cross-carrier scheduling in wireless communication systems using multiple TTIs. The techniques of example FIG. 8 may be used, for example, in multiple TTI communications between a UE and a base station such as discussed above with respect to FIGS. 1 and 2.

In this example, a UE may be configured for communications on a first component carrier CC-1, which may use 1 ms TTIs and that may include TTI-0 815 and TTI-1 820. The UE, in this example, also may be configured for communications using a second component carrier CC-2, which may use sTTIs and that may include sTTI-0 830, sTTI-1 840, sTTI-2 845, and sTTI-3 855. PDCCH transmissions 825 may be transmitted on the first component carrier CC-1, and sPDCCH transmissions 850 may be transmitted on the second component carrier CC-2. In some examples, as discussed above, two-stage grants may be used to indicate a grant of resources to a UE. In the example of FIG. 8, cross-carrier scheduling may be provided in the stage-0 grant included in PDCCH 825, that may provide a stage-0 grant to can schedule another component carrier such as second component carrier CC-2. In some examples, one stage-0 grant can schedule multiple component carriers, in which the same stage-0 grant information is applicable to all carriers.

Figure 9:
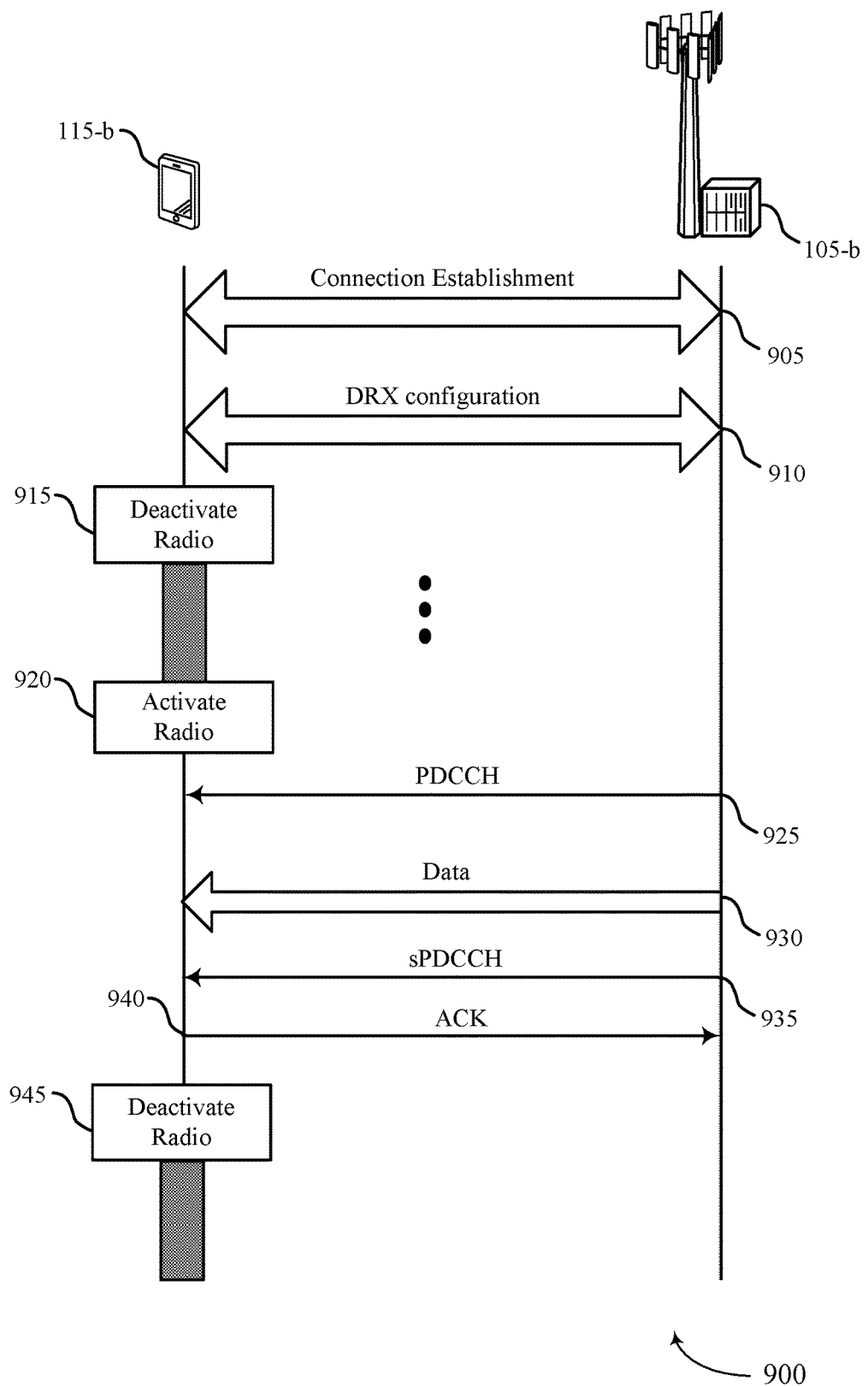
FIG. 9 illustrates an example of a process flow that supports discontinuous reception and scheduling techniques in wireless communication systems using multiple transmission time intervals in accordance with aspects of the present disclosure.

FIG. 9 illustrates an example of a process flow 900 for discontinuous reception and scheduling techniques in wireless communication systems using multiple transmission time intervals. Process flow 900 may include a base station 105-*b*, and a UE 115-*b*, which may be examples of the corresponding devices described with reference to FIG. 1-2. The base station 105-*b* and the UE 115-*b* may establish a connection 905 according to established connection establishment techniques for the wireless communications system. The base station 105-*b* and the UE 115-*b* also may establish a DRX configuration 910, in a manner such as discussed above with reference to FIGS. 1 through 8.

In accordance with the DRX configuration, the UE 115-*b* may deactivate one or more components associated with its radio, as indicated at block 915. After a DRX sleep period that is configured in DRX configuration 910, the UE 115-*b* may activate components of the radio, as indicated at block 920. The base station 105-*b* may transmit PDCCH 925, which may include downlink control information (DCI) that indicates a grant of resources for one or more transmissions that may use different TTI lengths. The base station 105-*b* may then transmit data 930, and also may transmit sPDCCH 935 using a different TTI than was used for transmission of PDCCH 925.

The UE 115-*b* may process the received information, and in some cases may transmit an acknowledgment 940 back to the base station 105-*b*. The UE 115-*b* may then again deactivate one or more radio components as indicated at block 945 in accordance with the DRX configuration 910. In various examples, the UE 115-*b* may activate one or more radio components at some subsequent time in order to receive one or more transmissions that may use different TTIs.

Figure 10:
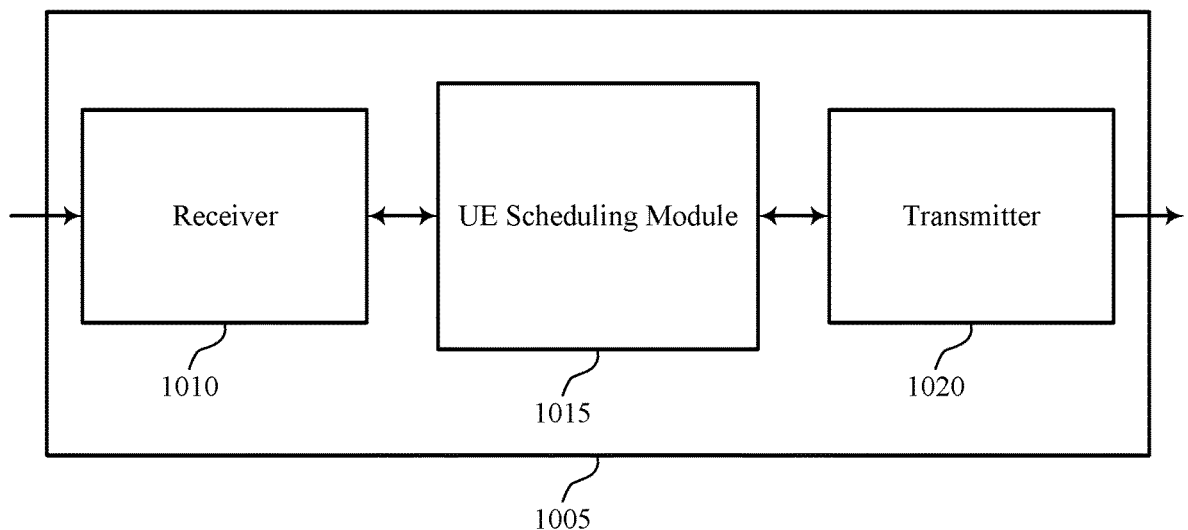
FIGS. 10 through 12 show block diagrams of a device that supports discontinuous reception and scheduling techniques in wireless communication systems using multiple transmission time intervals in accordance with aspects of the present disclosure.

FIG. 10 shows a block diagram 1000 of a wireless device 1005 that supports discontinuous reception and scheduling techniques in wireless communication systems using multiple transmission time intervals in accordance with various aspects of the present disclosure. Wireless device 1005 may be an example of aspects of a user equipment (UE) 115 as described with reference to FIG. 1. Wireless device 1005 may include receiver 1010, UE scheduling module 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to discontinuous reception and scheduling techniques in wireless communication systems using multiple transmission time intervals, etc.). Information may be passed on to other components of the device. The receiver 1010 may be an example of aspects of the transceiver 1335 described with reference to FIG. 13.

UE scheduling module 1015 may be an example of aspects of the UE scheduling module 1315 described with reference to FIG. 13. UE scheduling module 1015 may identify two or more available TTIs for transmissions between a base station and a UE, configure a DRX cycle based on the two or more available TTIs, and monitor for a control signal based on the configured DRX cycle.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
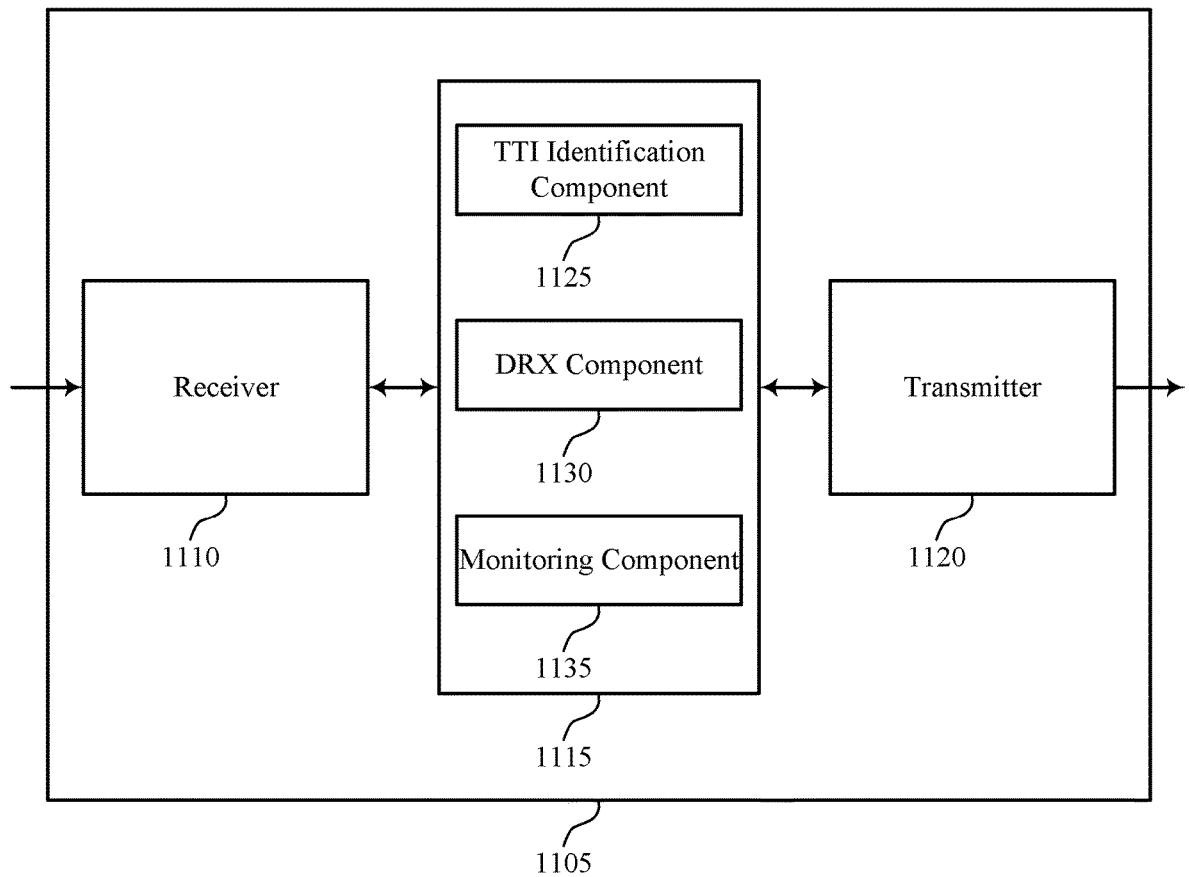

FIG. 11 shows a block diagram 1100 of a wireless device 1105 that supports discontinuous reception and scheduling techniques in wireless communication systems using multiple transmission time intervals in accordance with various aspects of the present disclosure. Wireless device 1105 may be an example of aspects of a wireless device 1005 or a UE 115 as described with reference to FIGS. 1 and 10. Wireless device 1105 may include receiver 1110, UE scheduling module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to discontinuous reception and scheduling techniques in wireless communication systems using multiple transmission time intervals, etc.). Information may be passed on to other components of the device. The receiver 1110 may be an example of aspects of the transceiver 1335 described with reference to FIG. 13.

UE scheduling module 1115 may be an example of aspects of the UE scheduling module 1315 described with reference to FIG. 13. UE scheduling module 1115 may also include TTI identification component 1125, DRX component 1130, and monitoring component 1135.

TTI identification component 1125 may identify two or more available TTIs for transmissions between a base station and a UE. DRX component 1130 may configure a DRX cycle based on the two or more available TTIs, which may include a first TTI duration and a second TTI duration. In some cases DRX component 1130 may configure a second DRX cycle for the second TTI duration that is independent of the first DRX cycle. In some cases, the configuring the DRX cycle further includes configuring the DRX cycle for a first TTI that is longer than a second TTI. In some cases, the configuring the DRX cycle further includes configuring the DRX cycle for a first TTI that is shorter than a second TTI.

Monitoring component 1135 may monitor for a control signal based on the configured DRX cycle, configure monitoring of a second control signal associated with the second TTI during active durations of the DRX cycle for the first TTI, determine that the second control signal is received. In some cases, monitoring component 1135 may monitor for the second portion of the two-stage grant of resources during the one or more time windows, and transition into a non-downlink-monitoring state prior to at least one of the one or more time windows.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
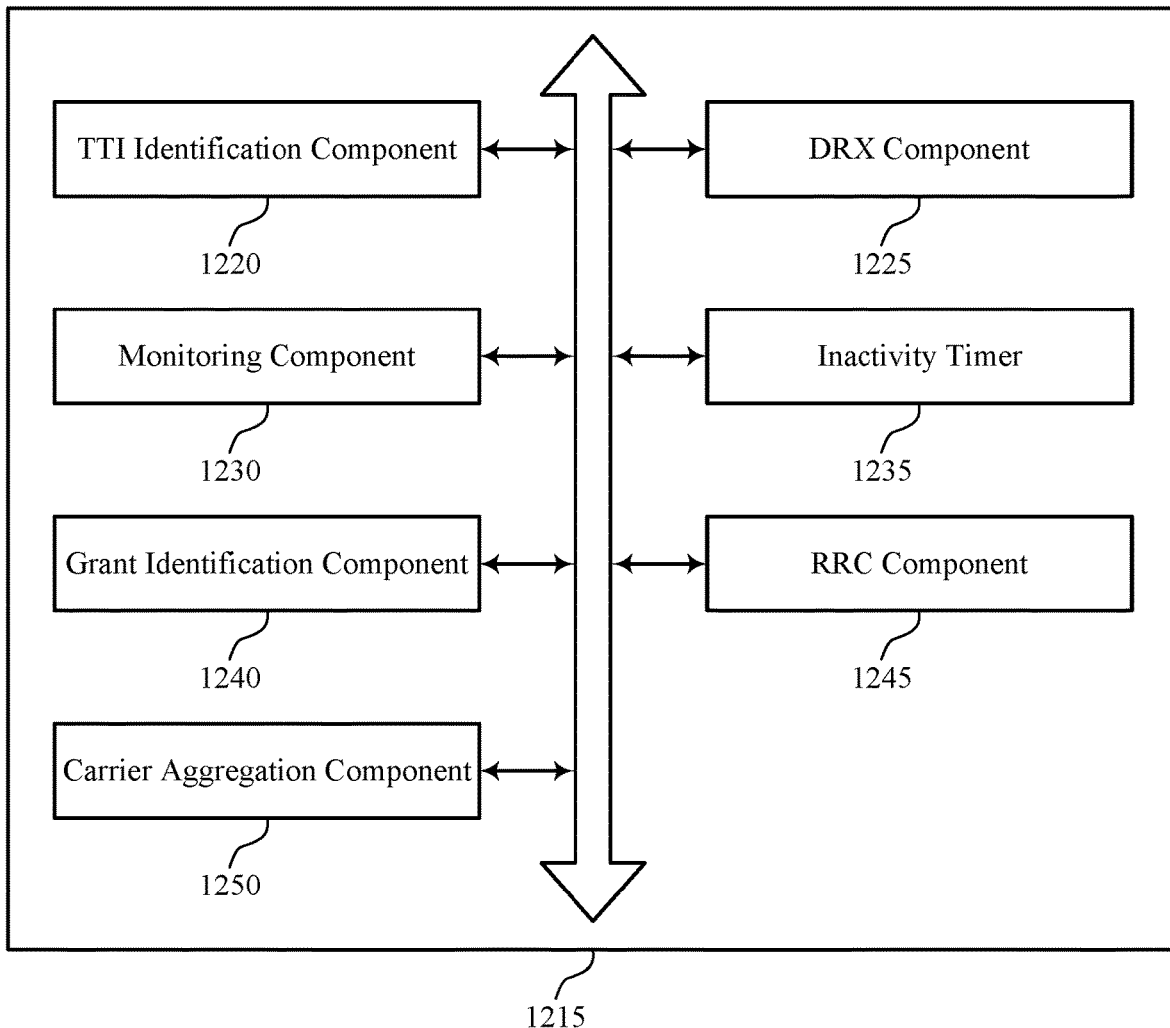

FIG. 12 shows a block diagram 1200 of a UE scheduling module 1215 that supports discontinuous reception and scheduling techniques in wireless communication systems using multiple transmission time intervals in accordance with various aspects of the present disclosure. The UE scheduling module 1215 may be an example of aspects of a UE scheduling module 1015, a UE scheduling module 1115, or a UE scheduling module 1315 described with reference to FIGS. 10, 11, and 13. The UE scheduling module 1215 may include TTI identification component 1220, DRX component 1225, monitoring component 1230, inactivity timer 1235, grant identification component 1240, radio resource control (RRC) component 1245, and carrier aggregation component 1250. Each of these modules may communicate, directly or indirectly, with one another (e.g., via one or more buses). TTI identification component 1220 may identify two or more available TTIs for transmissions between a base station and a UE.

DRX component 1225 may configure a DRX cycle based on the two or more available TTIs and configure a second DRX cycle for the second TTI duration that is independent of the first DRX cycle. In some cases, the configuring the DRX cycle further includes configuring the DRX cycle for a first TTI that is longer than a second TTI. In some cases, the configuring the DRX cycle further includes configuring the DRX cycle for a first TTI that is shorter than a second TTI.

Monitoring component 1230 may monitor for a control signal based on the configured DRX cycle, configure monitoring of a second control signal associated with the second TTI during active durations of the DRX cycle for the first TTI. In some cases, monitoring component 1230 may determine that a first-stage grant is received, monitor for the second portion of the two-stage grant of resources during the one or more time windows, and transition into a non-downlink-monitoring state prior to at least one of the one or more time windows.

Inactivity timer 1235 may reset an inactivity timer 1235 associated with the DRX cycle responsive to determining that the second control signal is received.

Grant identification component 1240 may determine that a control signal is received and includes a first portion of a two-stage grant of resources for a wireless transmission using the second TTI, identify one or more time windows for receiving a second portion of the two-stage grant of resources, and monitor for a third control signal associated with the first TTI, the first control signal including a second portion of a two-stage grant of resources associated with the first TTI. In some cases, the first portion of the grant of resources includes common information for a set of component carriers.

RRC component 1245 may receive, via RRC signaling, configuration information that indicates a location of resources to be monitored for the third control signal.

Carrier aggregation component 1250 may identify two or more component carriers for transmissions between the base station and the UE including a first component carrier that has a first TTI and a second component carrier that has a second TTI that is shorter than the first TTI, and where the configuring the DRX cycle further includes configuring a first DRX cycle for the first component carrier and configuring a second DRX cycle for the second component carrier that is independent of the first DRX cycle. In some cases, carrier aggregation component 1250 may identify two or more component carriers for transmissions between the base station and the UE including a first component carrier that has a first TTI and a second component carrier that has a second TTI that is shorter than the first TTI, and where the configuring the DRX cycle further includes configuring the DRX cycle for the first TTI and monitoring of a second control signal associated with the second component carrier during monitoring durations of the DRX cycle for the first TTI, and identify two or more component carriers for transmissions between the base station and the UE including a first component carrier and a second component carrier.

Figure 13:
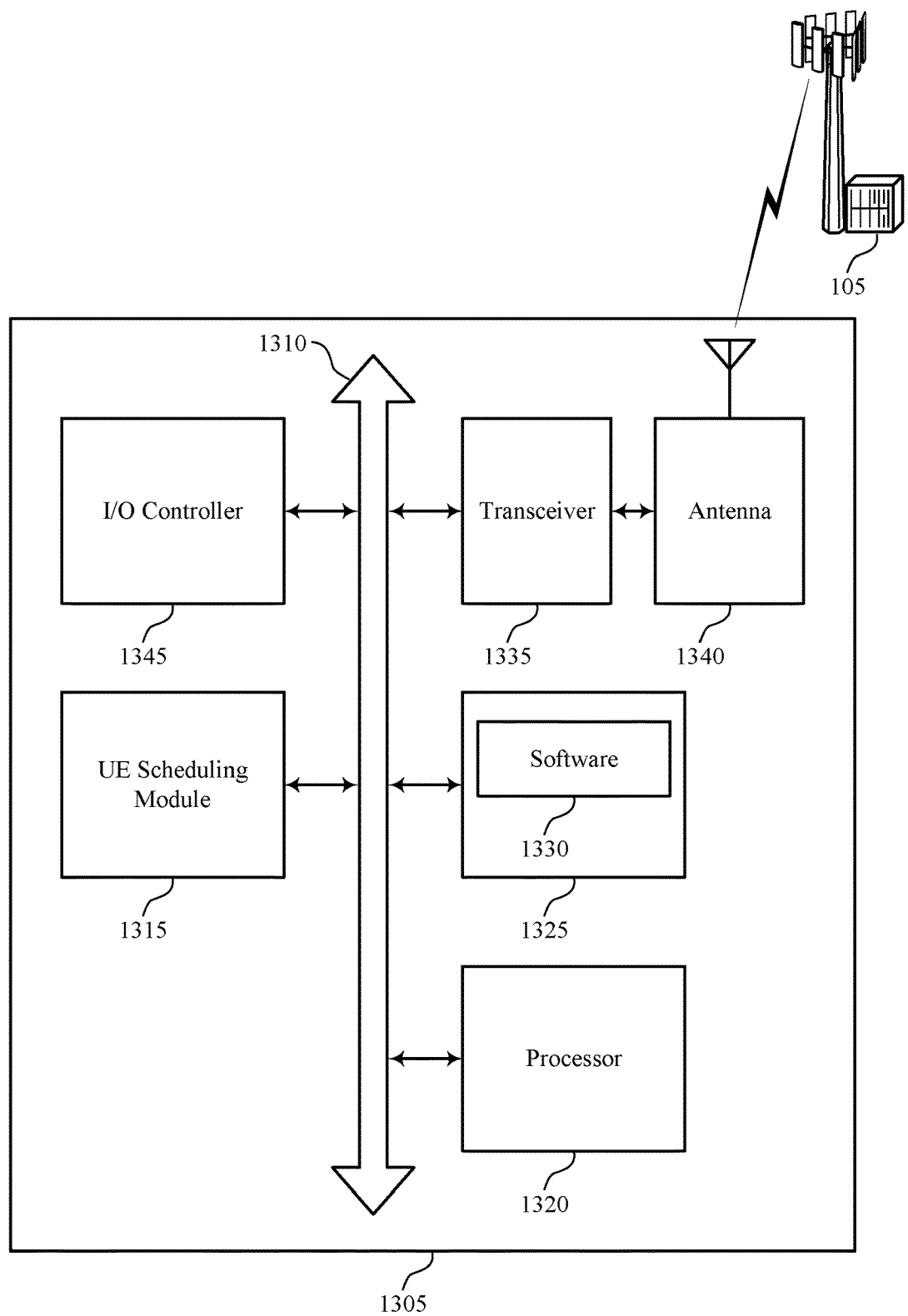
FIG. 13 illustrates a block diagram of a system including a UE that supports discontinuous reception and scheduling techniques in wireless communication systems using multiple transmission time intervals in accordance with aspects of the present disclosure.

FIG. 13 shows a diagram of a system 1300 including a device 1305 that supports discontinuous reception and scheduling techniques in wireless communication systems using multiple transmission time intervals in accordance with various aspects of the present disclosure. Device 1305 may be an example of or include the components of wireless device 1005, wireless device 1105, or a UE 115 as described above, e.g., with reference to FIGS. 1, 10 and 11. Device 1305 may include components for bi-directional voice and data communications including components for transmitting and receiving communications, including UE scheduling module 1315, processor 1320, memory 1325, software 1330, transceiver 1335, antenna 1340, and I/O controller 1345. These components may be in electronic communication via one or more busses (e.g., bus 1310). Device 1305 may communicate wirelessly with one or more base stations 105.

Processor 1320 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting discontinuous reception and scheduling techniques in wireless communication systems using multiple transmission time intervals).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware and/or software operation such as the interaction with peripheral components or devices.

Software 1330 may include code to implement aspects of the present disclosure, including code to support discontinuous reception and scheduling techniques in wireless communication systems using multiple transmission time intervals . Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
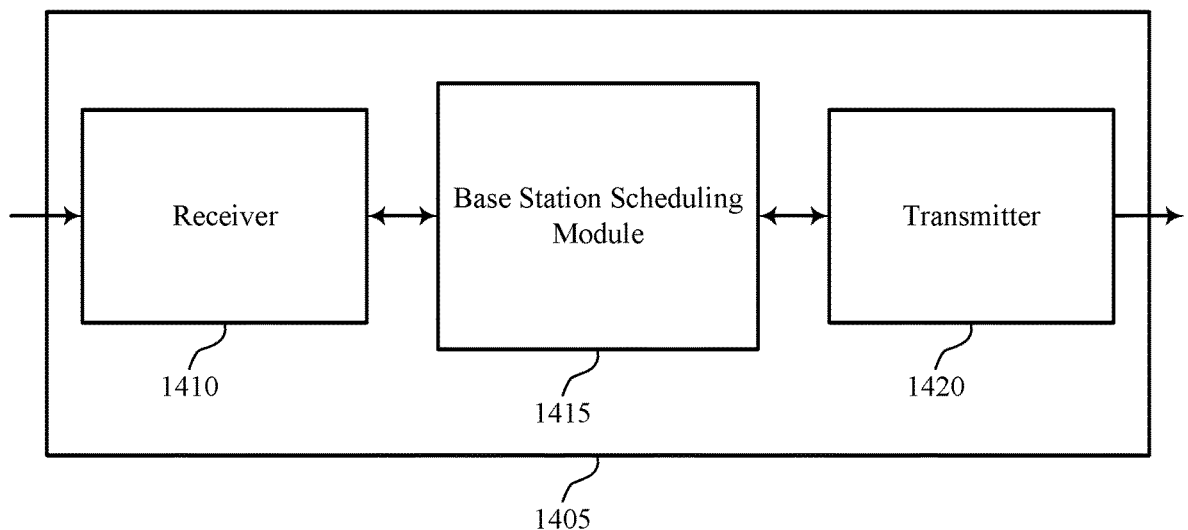
FIGS. 14 through 16 show block diagrams of a device that supports discontinuous reception and scheduling techniques in wireless communication systems using multiple transmission time intervals in accordance with aspects of the present disclosure.

FIG. 14 shows a block diagram 1400 of a wireless device 1405 that supports discontinuous reception and scheduling techniques in wireless communication systems using multiple transmission time intervals in accordance with various aspects of the present disclosure. Wireless device 1405 may be an example of aspects of a base station 105 as described with reference to FIG. 1. Wireless device 1405 may include receiver 1410, base station scheduling module 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to discontinuous reception and scheduling techniques in wireless communication systems using multiple transmission time intervals, etc.). Information may be passed on to other components of the device. The receiver 1410 may be an example of aspects of the transceiver 1735 described with reference to FIG. 17.

Base station scheduling module 1415 may be an example of aspects of the base station scheduling module 1715 described with reference to FIG. 17. Base station scheduling module 1415 may identify, at a base station, two or more available TTIs for transmissions between the base station and a UE, identify a DRX cycle configuration for the UE based on the two or more available TTIs, and transmit the DRX cycle configuration to the UE.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may include a single antenna, or it may include a set of antennas.

Figure 15:
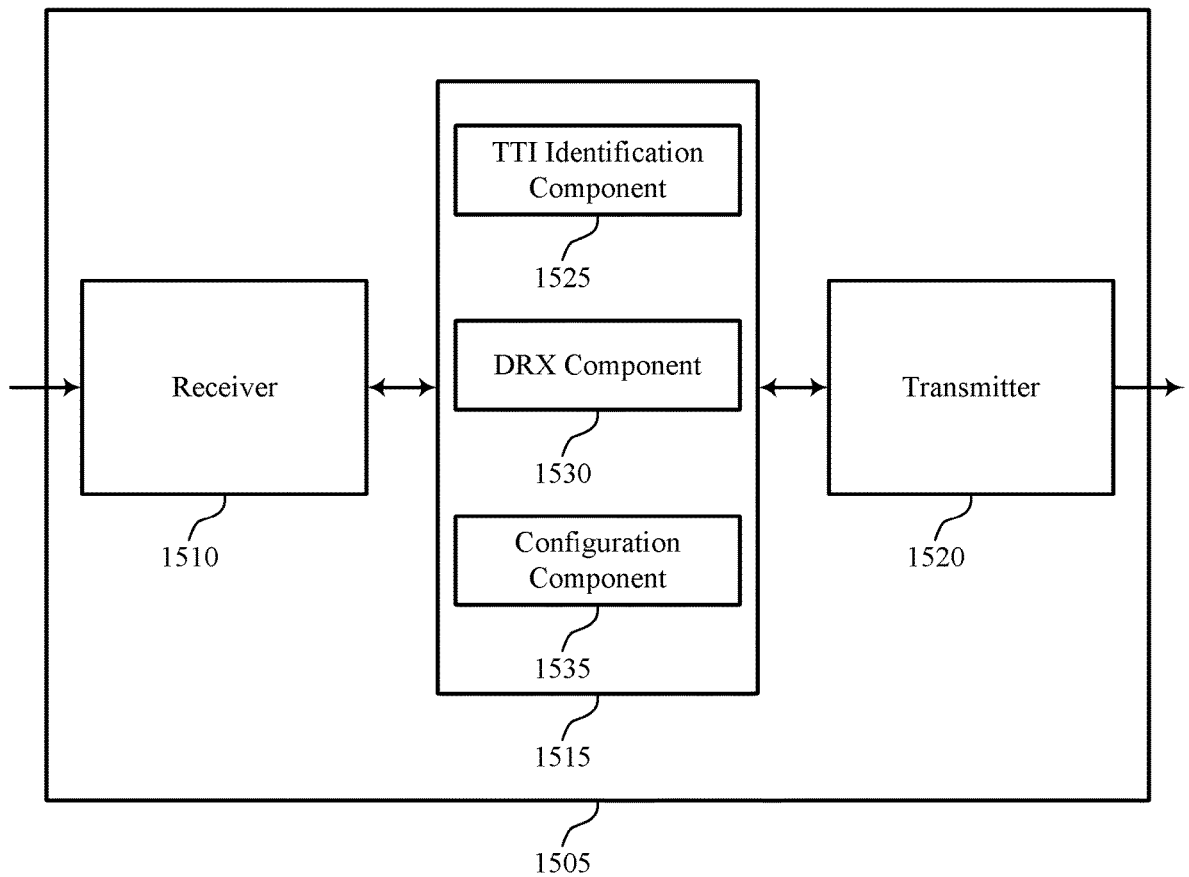

FIG. 15 shows a block diagram 1500 of a wireless device 1505 that supports discontinuous reception and scheduling techniques in wireless communication systems using multiple transmission time intervals in accordance with various aspects of the present disclosure. Wireless device 1505 may be an example of aspects of a wireless device 1405 or a base station 105 as described with reference to FIGS. 1 and 14. Wireless device 1505 may include receiver 1510, base station scheduling module 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to discontinuous reception and scheduling techniques in wireless communication systems using multiple transmission time intervals, etc.). Information may be passed on to other components of the device. The receiver 1510 may be an example of aspects of the transceiver 1735 described with reference to FIG. 17.

Base station scheduling module 1515 may be an example of aspects of the base station scheduling module 1715 described with reference to FIG. 17. Base station scheduling module 1515 may also include TTI identification component 1525, DRX component 1530, and configuration component 1535.

TTI identification component 1525 may identify, at a base station, two or more available TTIs for transmissions between the base station and a UE.

DRX component 1530 may identify a DRX cycle configuration for the UE based on the two or more available TTIs and configure the UE to monitor for a second control signal associated with the second TTI during monitoring durations of the DRX cycle for the first TTI. In some cases, the identifying the DRX cycle configuration further includes configuring the DRX cycle for a first TTI that is longer than a second TTI. In some cases, the identifying the DRX cycle configuration further includes configuring the DRX cycle for a first TTI that is shorter than a second TTI, and configuring the UE to monitor for a first control signal associated with the first TTI and to monitor for a second control signal associated with the second TTI during monitoring durations of the DRX cycle. In some cases, the identifying the DRX cycle configuration further includes configuring a first DRX cycle for a first TTI duration that is shorter than a second TTI duration.

Configuration component 1535 may transmit the DRX cycle configuration to the UE, configure the UE to reset an inactivity timer associated with the DRX cycle responsive to determining that the second control signal is received, configure the UE to monitor for a first portion of the two-stage resource grant during monitoring durations of the DRX cycle for the first TTI, configure one or more time windows for the UE to monitor for a second portion of the two-stage resource grant, configure the UE to monitor for a third control signal associated with the first TTI, the third control signal including a first portion of the two-stage resource grant and the first control signal including a second portion of the two-stage resource grant, and configure a second DRX cycle for the second TTI duration that is independent of the first DRX cycle.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may include a single antenna, or it may include a set of antennas.

Figure 16:
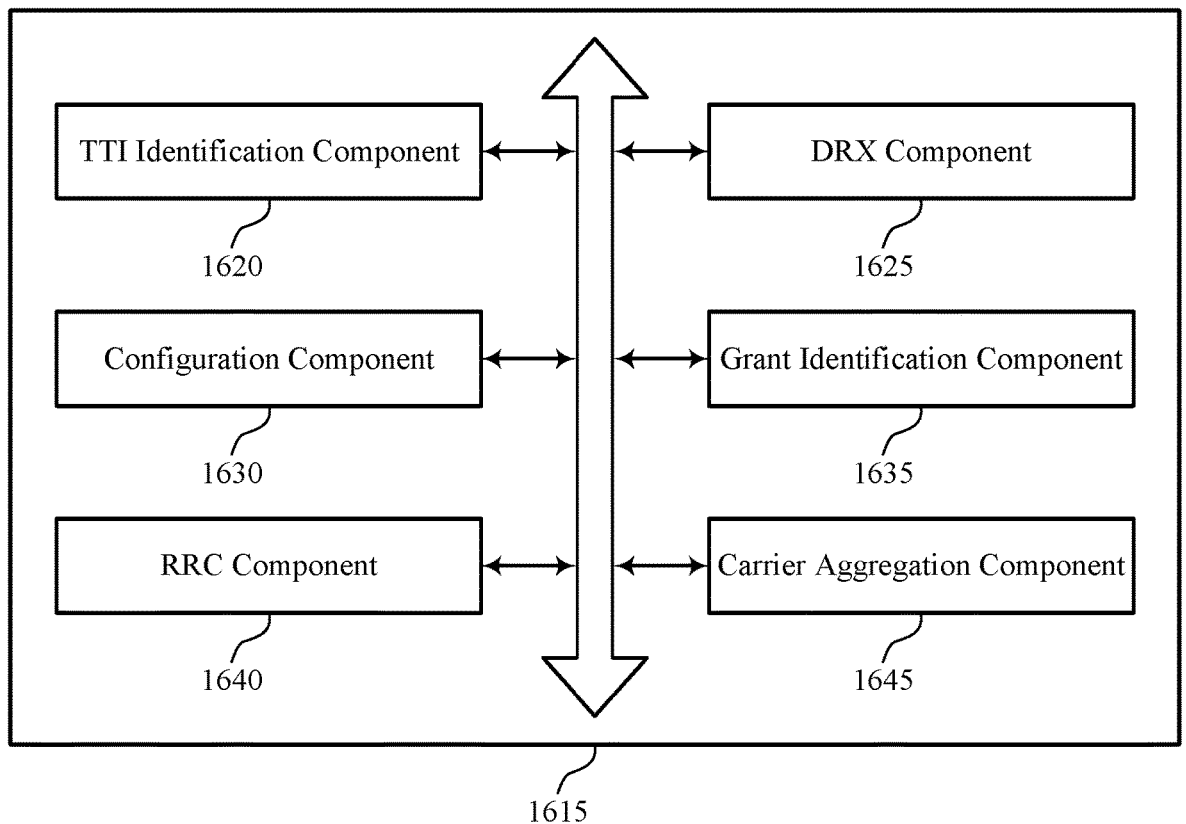

FIG. 16 shows a block diagram 1600 of a base station scheduling module 1615 that supports discontinuous reception and scheduling techniques in wireless communication systems using multiple transmission time intervals in accordance with various aspects of the present disclosure. The base station scheduling module 1615 may be an example of aspects of a base station scheduling module 1715 described with reference to FIGS. 14, 15, and 17. The base station scheduling module 1615 may include TTI identification component 1620, DRX component 1625, configuration component 1630, grant identification component 1635, RRC component 1640, and carrier aggregation component 1645. Each of these modules may communicate, directly or indirectly, with one another (e.g., via one or more buses).

TTI identification component 1620 may identify, at a base station, two or more available TTIs for transmissions between the base station and a UE.

DRX component 1625 may identify a DRX cycle configuration for the UE based on two or more available TTIs and configure the UE to monitor for a second control signal associated with the second TTI during monitoring durations of the DRX cycle for the first TTI. In some cases, the identifying the DRX cycle configuration further includes configuring the DRX cycle for a first TTI that is longer than a second TTI. In some cases, the identifying the DRX cycle configuration further includes configuring the DRX cycle for a first TTI that is shorter than a second TTI, and configuring the UE to monitor for a first control signal associated with the first TTI and to monitor for a second control signal associated with the second TTI during monitoring durations of the DRX cycle. In some cases, the identifying the DRX cycle configuration further includes configuring a first DRX cycle for a first TTI duration that is shorter than a second TTI duration.

Configuration component 1630 may transmit the DRX cycle configuration to the UE, configure the UE to reset an inactivity timer associated with the DRX cycle responsive to determining that the second control signal is received, and may configure the UE to monitor for a first portion of the two-stage resource grant during monitoring durations of the DRX cycle for the first TTI. In some cases one or more time windows may be configured for the UE to monitor for a second portion of the two-stage resource grant, and the UE may be configured to monitor for a third control signal associated with the first TTI, the third control signal including a first portion of the two-stage resource grant and the first control signal including a second portion of the two-stage resource grant.

Grant identification component 1635 may identify that the UE is to receive a two-stage resource grant for a grant of resources for a wireless transmission using the second TTI, transmit a first portion of a two-stage grant of resources associated with the second component carrier using the first component carrier, and transmit a second portion of the two-stage grant of resources using the second component carrier. In some cases, the first portion of the grant of resources includes common information for a set of component carriers.

RRC component 1640 may transmit RRC signaling to the UE that indicates a location of resources to be monitored for the third control signal.

Carrier aggregation component 1645 may identify two or more component carriers for transmissions between the base station and the UE including a first component carrier that has a first TTI and a second component carrier that has a second TTI that is shorter than the first TTI, and where the identifying the DRX cycle configuration further includes configuring a first DRX cycle for the first component carrier and configuring a second DRX cycle for the second component carrier that is independent of the first DRX cycle. Carrier aggregation component 1645 may, in some cases, identify two or more component carriers for transmissions between the base station and the UE including a first component carrier that has a first TTI and a second component carrier that has a second TTI that is shorter than the first TTI, and where the identifying the DRX cycle configuration further includes configuring the DRX cycle for the first TTI and monitoring of a second control signal associated with the second component carrier during monitoring durations of the DRX cycle for the first TTI. In some cases, two or more component carriers may be identified for transmissions between the base station and the UE including a first component carrier and a second component carrier.

Figure 17:
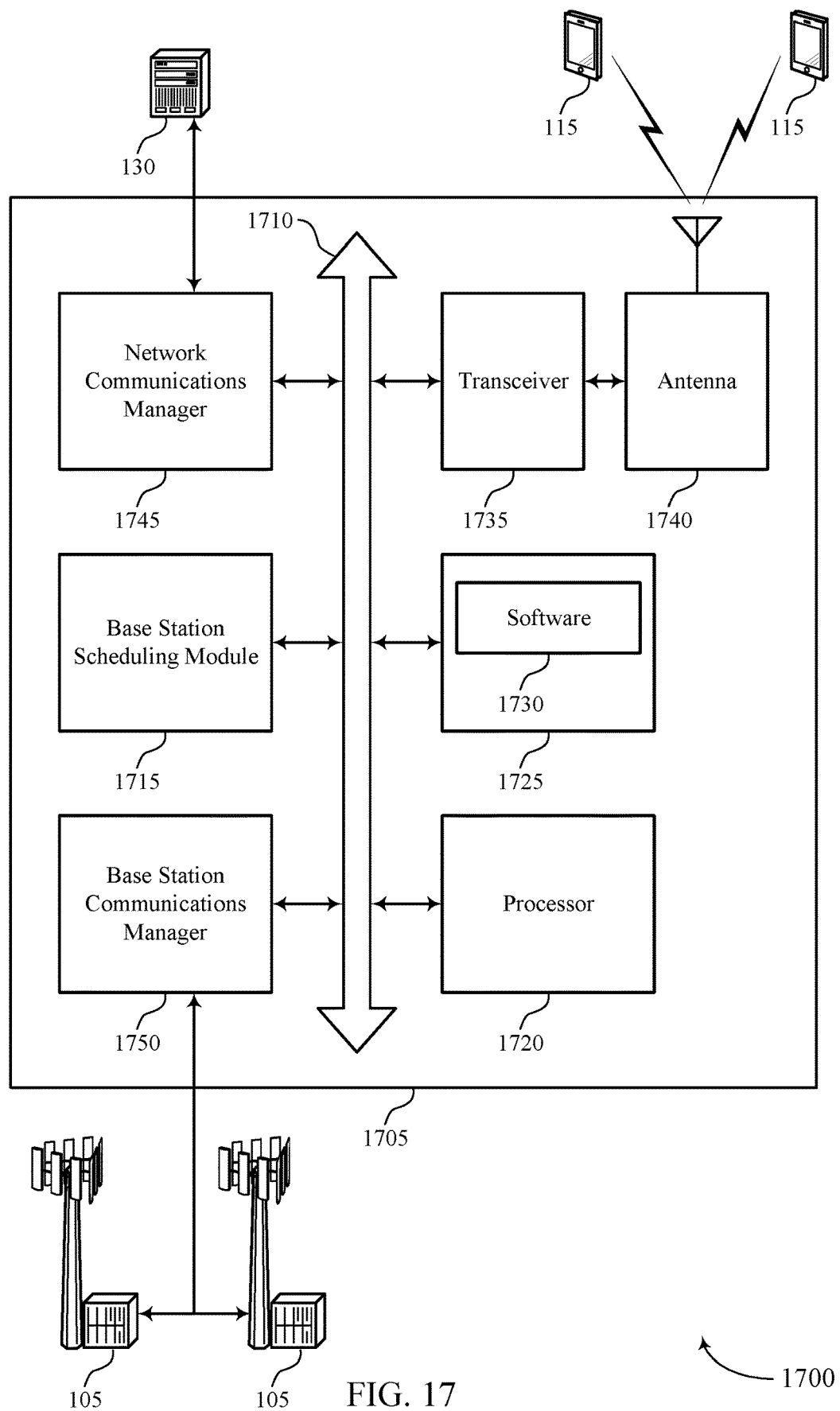
FIG. 17 illustrates a block diagram of a system including a base station that supports discontinuous reception and scheduling techniques in wireless communication systems using multiple transmission time intervals in accordance with aspects of the present disclosure.

FIG. 17 shows a diagram of a system 1700 including a device 1705 that supports discontinuous reception and scheduling techniques in wireless communication systems using multiple transmission time intervals in accordance with various aspects of the present disclosure. Device 1705 may be an example of or include the components of base station 105 as described above, e.g., with reference to FIG. 1. Device 1705 may include components for bi-directional voice and data communications including components for transmitting and receiving communications, including base station scheduling module 1715, processor 1720, memory 1725, software 1730, transceiver 1735, antenna 1740, network communications manager 1745, and base station communications manager 1750. These components may be in electronic communication via one or more busses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting discontinuous reception and scheduling techniques in wireless communication systems using multiple transmission time intervals).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware and/or software operation such as the interaction with peripheral components or devices.

Software 1730 may include code to implement aspects of the present disclosure, including code to support discontinuous reception and scheduling techniques in wireless communication systems using multiple transmission time intervals . Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Base station communications manager 1750 may manage communications with other base station 105, and may include a controller or scheduler for controlling communications with UEs 115 in cooperation with other base stations 105. For example, the base station communications manager 1750 may coordinate scheduling for transmissions to UEs 115 for various interference mitigation techniques such as beamforming or joint transmission. In some examples, base station communications manager 1750 may provide an X2 interface within an Long Term Evolution (LTE)/LTE-A wireless communication network technology to provide communication between base stations 105.

Figure 18:
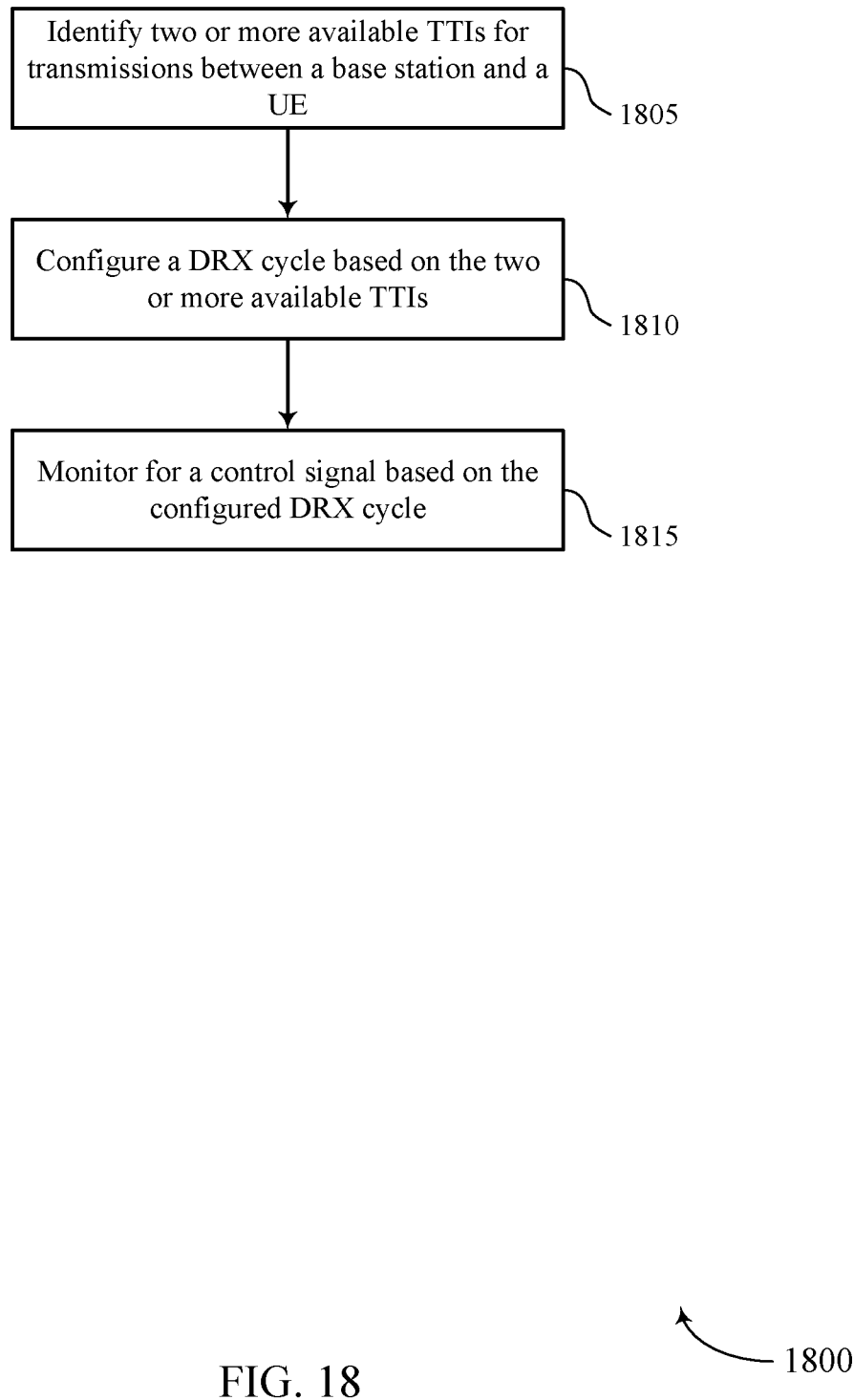
FIGS. 18 through 26 illustrate methods for discontinuous reception and scheduling techniques in wireless communication systems using multiple transmission time intervals in accordance with aspects of the present disclosure.

FIG. 18 shows a flowchart illustrating a method 1800 for discontinuous reception and scheduling techniques in wireless communication systems using multiple transmission time intervals in accordance with various aspects of the present disclosure. The operations of method 1800 may be implemented by a UE 115 or its components as described herein. For example, the operations of method 1800 may be performed by a UE scheduling module as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may identify two or more available TTIs for transmissions between a base station and a UE. The operations of block 1805 may be performed according to the methods described with reference to FIGS. 1 through 9. In certain examples, aspects of the operations of block 1805 may be performed by a TTI identification component as described with reference to FIGS. 10 through 13.

At block 1810 the UE 115 may configure a DRX cycle based at least in part on the two or more available TTIs. The operations of block 1810 may be performed according to the methods described with reference to FIGS. 1 through 9. In certain examples, aspects of the operations of block 1810 may be performed by a DRX component as described with reference to FIGS. 10 through 13.

At block 1815 the UE 115 may monitor for a control signal based at least in part on the configured DRX cycle. The operations of block 1815 may be performed according to the methods described with reference to FIGS. 1 through 9. In certain examples, aspects of the operations of block 1815 may be performed by a monitoring component as described with reference to FIGS. 10 through 13.

Figure 19:
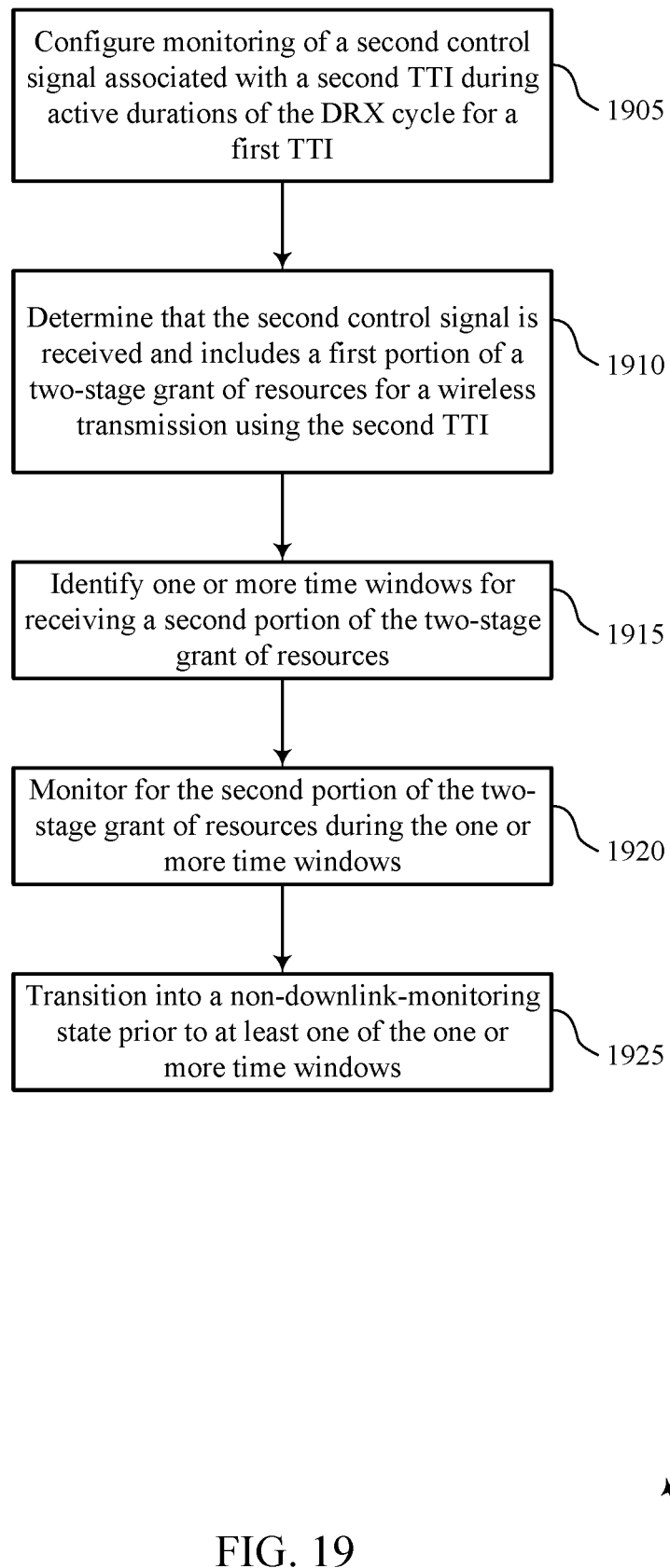

FIG. 19 shows a flowchart illustrating a method 1900 for discontinuous reception and scheduling techniques in wireless communication systems using multiple transmission time intervals in accordance with various aspects of the present disclosure. The operations of method 1900 may be implemented by a UE 115 or its components as described herein. For example, the operations of method 1900 may be performed by a UE scheduling module as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may configure monitoring of a second control signal associated with a second TTI during active durations of a DRX cycle for a first TTI. The operations of block 1905 may be performed according to the methods described with reference to FIGS. 1 through 9. In certain examples, aspects of the operations of block 1905 may be performed by a monitoring component as described with reference to FIGS. 10 through 13.

At block 1910 the UE 115 may determine that the second control signal is received and includes a first portion of a two-stage grant of resources for a wireless transmission using the second TTI. The operations of block 1910 may be performed according to the methods described with reference to FIGS. 1 through 9. In certain examples, aspects of the operations of block 1910 may be performed by a grant identification component as described with reference to FIGS. 10 through 13.

At block 1915 the UE 115 may identify one or more time windows for receiving a second portion of the two-stage grant of resources. The operations of block 1915 may be performed according to the methods described with reference to FIGS. 1 through 9. In certain examples, aspects of the operations of block 1915 may be performed by a grant identification component as described with reference to FIGS. 10 through 13.

At block 1920 the UE 115 may monitor for the second portion of the two-stage grant of resources during the one or more time windows. The operations of block 1920 may be performed according to the methods described with reference to FIGS. 1 through 9. In certain examples, aspects of the operations of block 1920 may be performed by a monitoring component as described with reference to FIGS. 10 through 13.

At block 1925 the UE 115 may transition into a non-downlink-monitoring state prior to at least one of the one or more time windows. The operations of block 1925 may be performed according to the methods described with reference to FIGS. 1 through 9. In certain examples, aspects of the operations of block 1925 may be performed by a monitoring component as described with reference to FIGS. 10 through 13.

Figure 20:
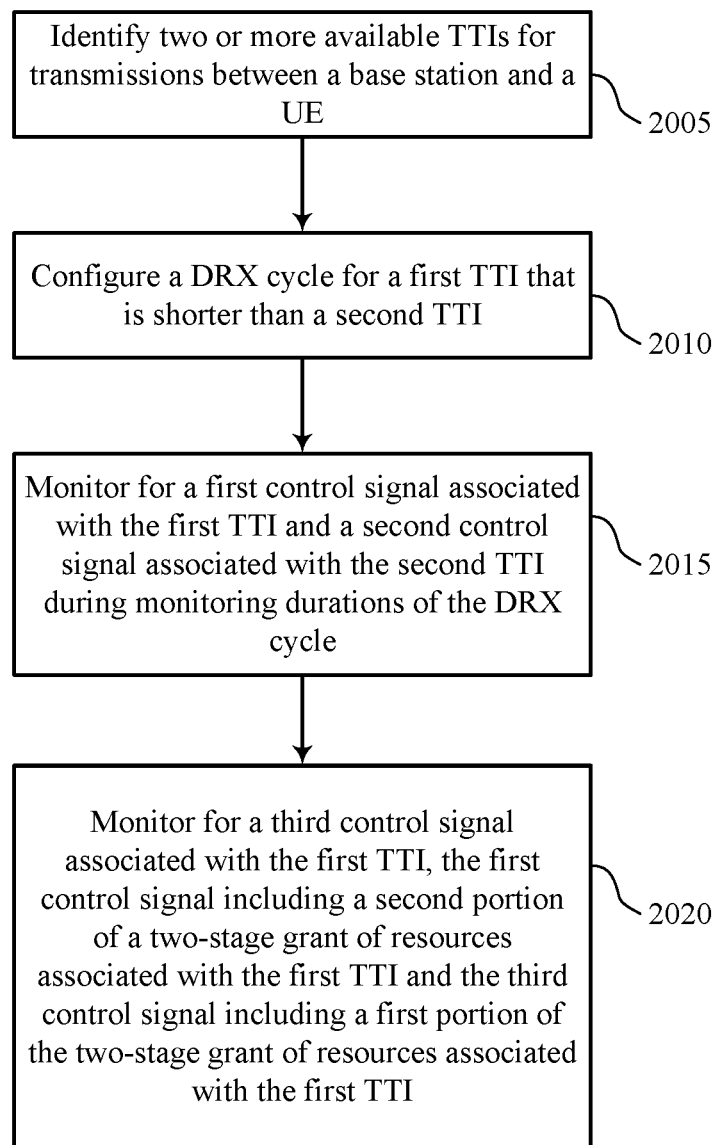

FIG. 20 shows a flowchart illustrating a method 2000 for discontinuous reception and scheduling techniques in wireless communication systems using multiple transmission time intervals in accordance with various aspects of the present disclosure. The operations of method 2000 may be implemented by a UE 115 or its components as described herein. For example, the operations of method 2000 may be performed by a UE scheduling module as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may identify two or more available TTIs for transmissions between a base station and a UE. The operations of block 2005 may be performed according to the methods described with reference to FIGS. 1 through 9. In certain examples, aspects of the operations of block 2005 may be performed by a TTI identification component as described with reference to FIGS. 10 through 13.

At block 2010 the UE 115 may configure a DRX cycle for a first TTI that is shorter than a second TTI. The operations of block 2010 may be performed according to the methods described with reference to FIGS. 1 through 9. In certain examples, aspects of the operations of block 2010 may be performed by a DRX component as described with reference to FIGS. 10 through 13.

At block 2015 the UE 115 may monitor for a first control signal associated with the first TTI and a second control signal associated with the second TTI during monitoring durations of the DRX cycle. The operations of block 2015 may be performed according to the methods described with reference to FIGS. 1 through 9. In certain examples, aspects of the operations of block 2015 may be performed by a monitoring component as described with reference to FIGS. 10 through 13.

At block 2020 the UE 115 may monitor for a third control signal associated with the first TTI, the first control signal including a second portion of a two-stage grant of resources associated with the first TTI and the third control signal including a first portion of the two-stage grant of resources associated with the first TTI. The operations of block 2020 may be performed according to the methods described with reference to FIGS. 1 through 9. In certain examples, aspects of the operations of block 2020 may be performed by a grant identification component as described with reference to FIGS. 10 through 13.

Figure 21:
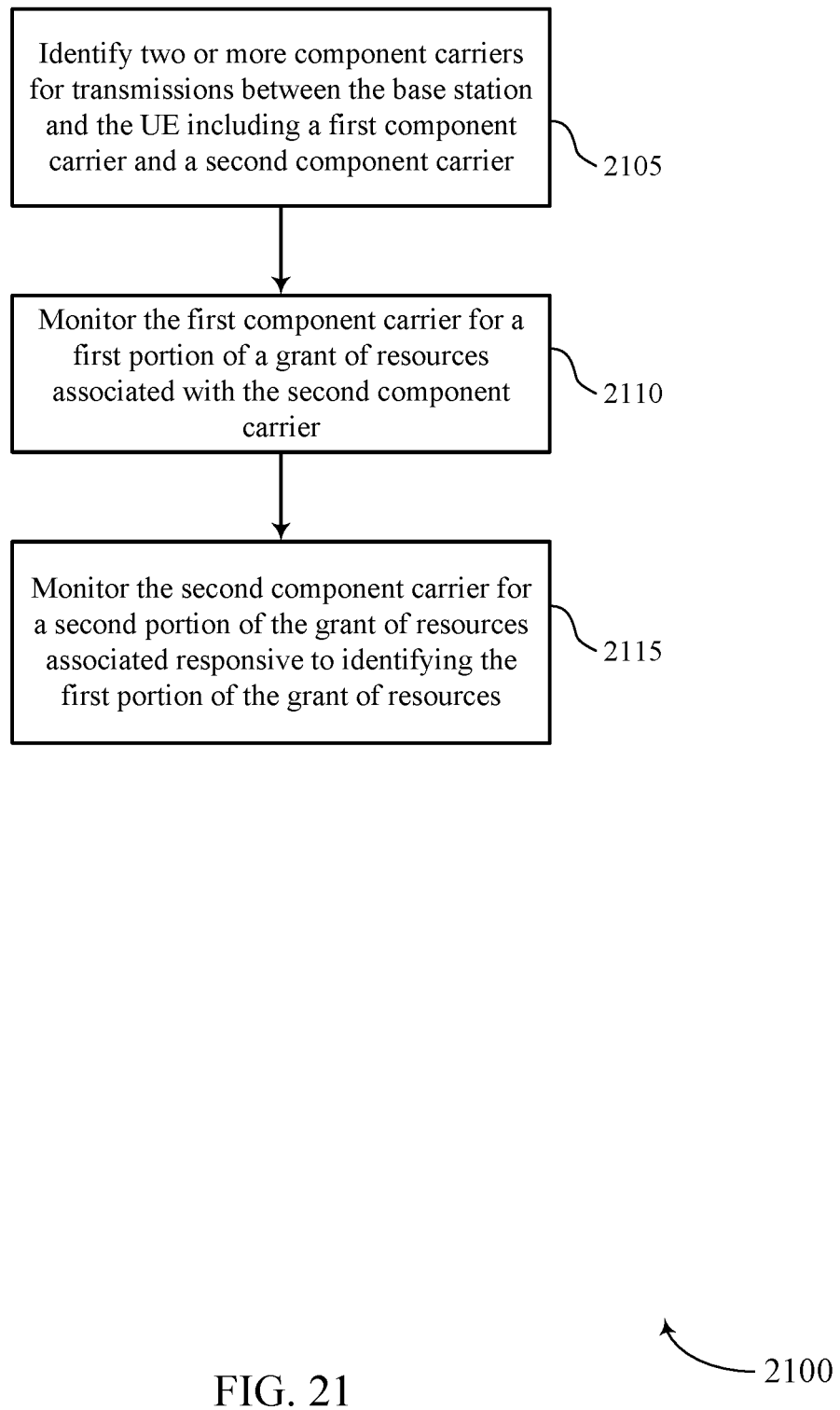

FIG. 21 shows a flowchart illustrating a method 2100 for discontinuous reception and scheduling techniques in wireless communication systems using multiple transmission time intervals in accordance with various aspects of the present disclosure. The operations of method 2100 may be implemented by a UE 115 or its components as described herein. For example, the operations of method 2100 may be performed by a UE scheduling module as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At block 2105 the UE 115 may identify two or more component carriers for transmissions between the base station and the UE including a first component carrier and a second component carrier. The operations of block 2105 may be performed according to the methods described with reference to FIGS. 1 through 9. In certain examples, aspects of the operations of block 2105 may be performed by a carrier aggregation component as described with reference to FIGS. 10 through 13.

At block 2110 the UE 115 may monitor the first component carrier for a first portion of a grant of resources associated with the second component carrier. The operations of block 2110 may be performed according to the methods described with reference to FIGS. 1 through 9. In certain examples, aspects of the operations of block 2110 may be performed by a monitoring component as described with reference to FIGS. 10 through 13.

At block 2115 the UE 115 may monitor the second component carrier for a second portion of the grant of resources associated responsive to identifying the first portion of the grant of resources. The operations of block 2115 may be performed according to the methods described with reference to FIGS. 1 through 9. In certain examples, aspects of the operations of block 2115 may be performed by a grant identification component as described with reference to FIGS. 10 through 13.

Figure 22:
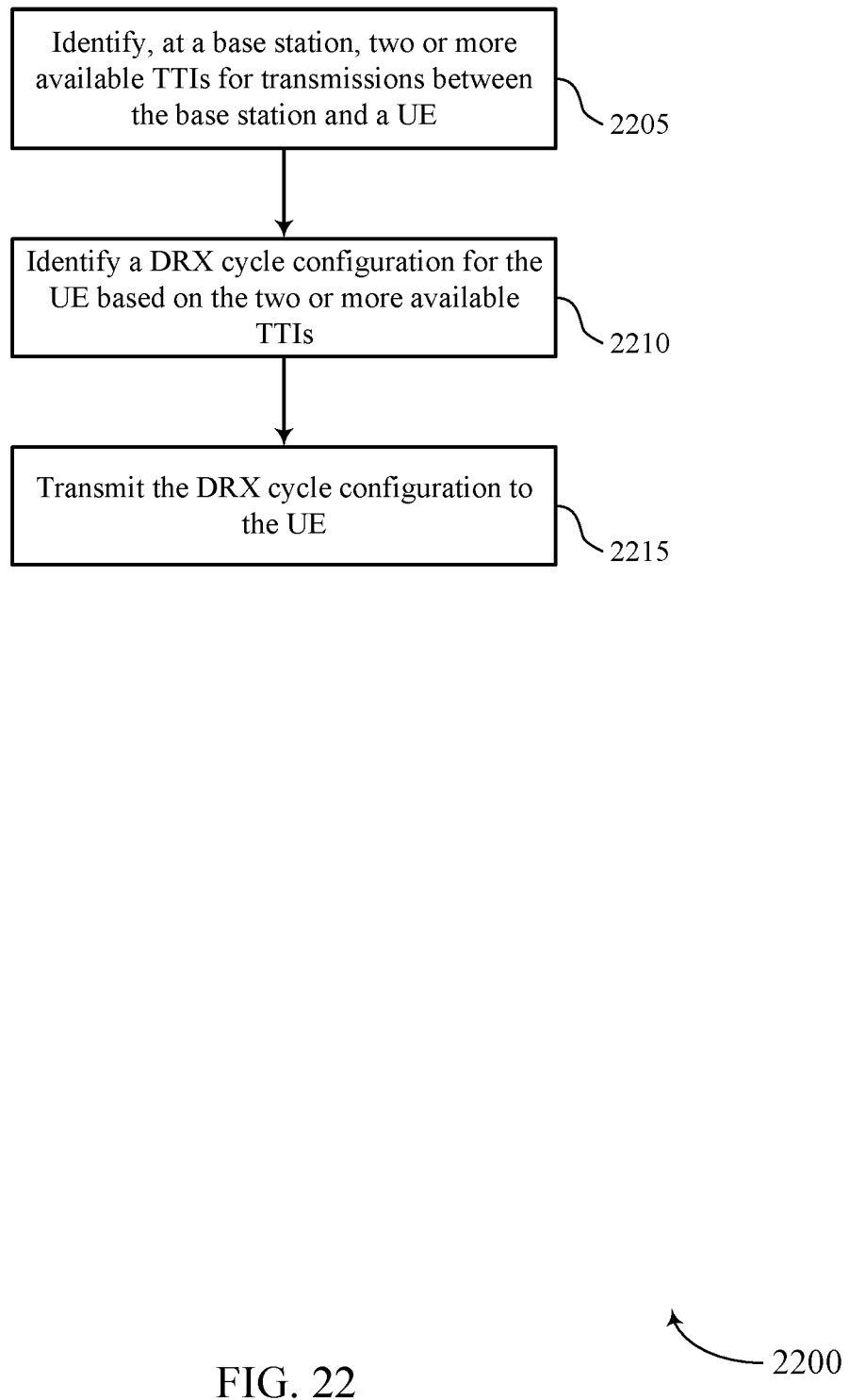

FIG. 22 shows a flowchart illustrating a method 2200 for discontinuous reception and scheduling techniques in wireless communication systems using multiple transmission time intervals in accordance with various aspects of the present disclosure. The operations of method 2200 may be implemented by a base station 105 or its components as described herein. For example, the operations of method 2200 may be performed by a base station scheduling module as described with reference to FIGS. 14 through 17. In some examples, a base station 105 may execute a set of codes to control the functional elements of the device to perform the functions described below. Additionally or alternatively, the base station 105 may perform aspects the functions described below using special-purpose hardware.

At block 2205 the base station 105 may identify two or more available TTIs for transmissions between the base station and a UE. The operations of block 2205 may be performed according to the methods described with reference to FIGS. 1 through 9. In certain examples, aspects of the operations of block 2205 may be performed by a TTI identification component as described with reference to FIGS. 14 through 17.

At block 2210 the base station 105 may identify a DRX cycle configuration for the UE based at least in part on the two or more available TTIs. The operations of block 2210 may be performed according to the methods described with reference to FIGS. 1 through 9. In certain examples, aspects of the operations of block 2210 may be performed by a DRX component as described with reference to FIGS. 14 through 17.

At block 2215 the base station 105 may transmit the DRX cycle configuration to the UE. The operations of block 2215 may be performed according to the methods described with reference to FIGS. 1 through 9. In certain examples, aspects of the operations of block 2215 may be performed by a configuration component as described with reference to FIGS. 14 through 17.

Figure 23:
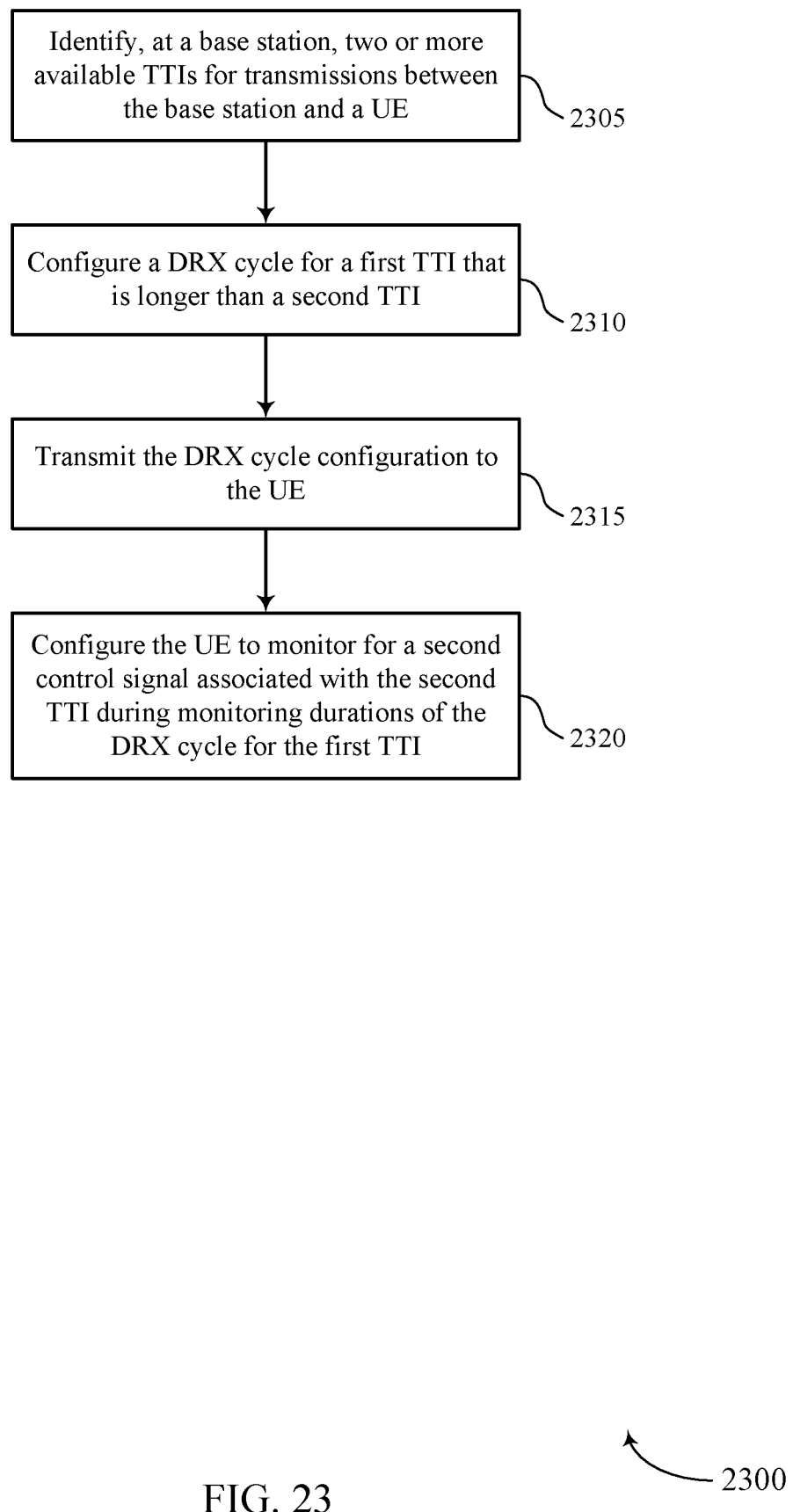

FIG. 23 shows a flowchart illustrating a method 2300 for discontinuous reception and scheduling techniques in wireless communication systems using multiple transmission time intervals in accordance with various aspects of the present disclosure. The operations of method 2300 may be implemented by a base station 105 or its components as described herein. For example, the operations of method 2300 may be performed by a base station scheduling module as described with reference to FIGS. 14 through 17. In some examples, a base station 105 may execute a set of codes to control the functional elements of the device to perform the functions described below. Additionally or alternatively, the base station 105 may perform aspects the functions described below using special-purpose hardware.

At block 2305 the base station 105 may identify two or more available TTIs for transmissions between the base station and a UE. The operations of block 2305 may be performed according to the methods described with reference to FIGS. 1 through 9. In certain examples, aspects of the operations of block 2305 may be performed by a TTI identification component as described with reference to FIGS. 14 through 17.

At block 2310 the base station 105 may configure a DRX cycle for a first TTI that is longer than a second TTI. The operations of block 2310 may be performed according to the methods described with reference to FIGS. 1 through 9. In certain examples, aspects of the operations of block 2310 may be performed by a DRX component as described with reference to FIGS. 14 through 17.

At block 2315 the base station 105 may transmit the DRX cycle configuration to the UE. The operations of block 2315 may be performed according to the methods described with reference to FIGS. 1 through 9. In certain examples, aspects of the operations of block 2315 may be performed by a configuration component as described with reference to FIGS. 14 through 17.

At block 2320 the base station 105 may configure the UE to monitor for a second control signal associated with the second TTI during monitoring durations of the DRX cycle for the first TTI. The operations of block 2320 may be performed according to the methods described with reference to FIGS. 1 through 9. In certain examples, aspects of the operations of block 2320 may be performed by a DRX component as described with reference to FIGS. 14 through 17.

Figure 24:
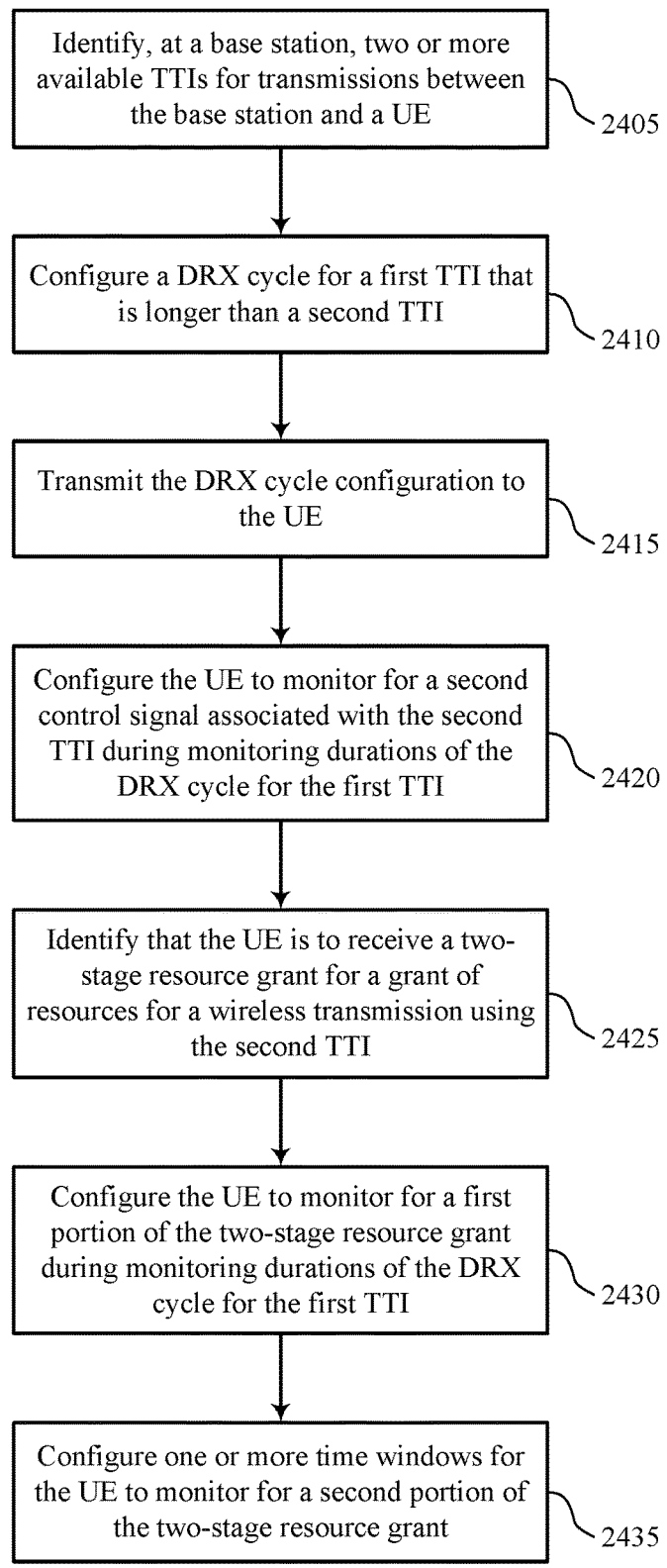

FIG. 24 shows a flowchart illustrating a method 2400 for discontinuous reception and scheduling techniques in wireless communication systems using multiple transmission time intervals in accordance with various aspects of the present disclosure. The operations of method 2400 may be implemented by a base station 105 or its components as described herein. For example, the operations of method 2400 may be performed by a base station scheduling module as described with reference to FIGS. 14 through 17. In some examples, a base station 105 may execute a set of codes to control the functional elements of the device to perform the functions described below. Additionally or alternatively, the base station 105 may perform aspects the functions described below using special-purpose hardware.

At block 2405 the base station 105 may identify two or more available TTIs for transmissions between the base station and a UE. The operations of block 2405 may be performed according to the methods described with reference to FIGS. 1 through 9. In certain examples, aspects of the operations of block 2405 may be performed by a TTI identification component as described with reference to FIGS. 14 through 17.

At block 2410 the base station 105 may configure a DRX cycle for a first TTI that is longer than a second TTI. The operations of block 2410 may be performed according to the methods described with reference to FIGS. 1 through 9. In certain examples, aspects of the operations of block 2410 may be performed by a DRX component as described with reference to FIGS. 14 through 17.

At block 2415 the base station 105 may transmit the DRX cycle configuration to the UE. The operations of block 2415 may be performed according to the methods described with reference to FIGS. 1 through 9. In certain examples, aspects of the operations of block 2415 may be performed by a configuration component as described with reference to FIGS. 14 through 17.

At block 2420 the base station 105 may configure the UE to monitor for a second control signal associated with the second TTI during monitoring durations of the DRX cycle for the first TTI. The operations of block 2420 may be performed according to the methods described with reference to FIGS. 1 through 9. In certain examples, aspects of the operations of block 2420 may be performed by a DRX component as described with reference to FIGS. 14 through 17.

At block 2425 the base station 105 may identify that the UE is to receive a two-stage resource grant for a grant of resources for a wireless transmission using the second TTI. The operations of block 2425 may be performed according to the methods described with reference to FIGS. 1 through 9. In certain examples, aspects of the operations of block 2425 may be performed by a grant identification component as described with reference to FIGS. 14 through 17.

At block 2430 the base station 105 may configure the UE to monitor for a first portion of the two-stage resource grant during monitoring durations of the DRX cycle for the first TTI. The operations of block 2430 may be performed according to the methods described with reference to FIGS. 1 through 9. In certain examples, aspects of the operations of block 2430 may be performed by a configuration component as described with reference to FIGS. 14 through 17.

At block 2435 the base station 105 may configure one or more time windows for the UE to monitor for a second portion of the two-stage resource grant. The operations of block 2435 may be performed according to the methods described with reference to FIGS. 1 through 9. In certain examples, aspects of the operations of block 2435 may be performed by a configuration component as described with reference to FIGS. 14 through 17.

Figure 25:
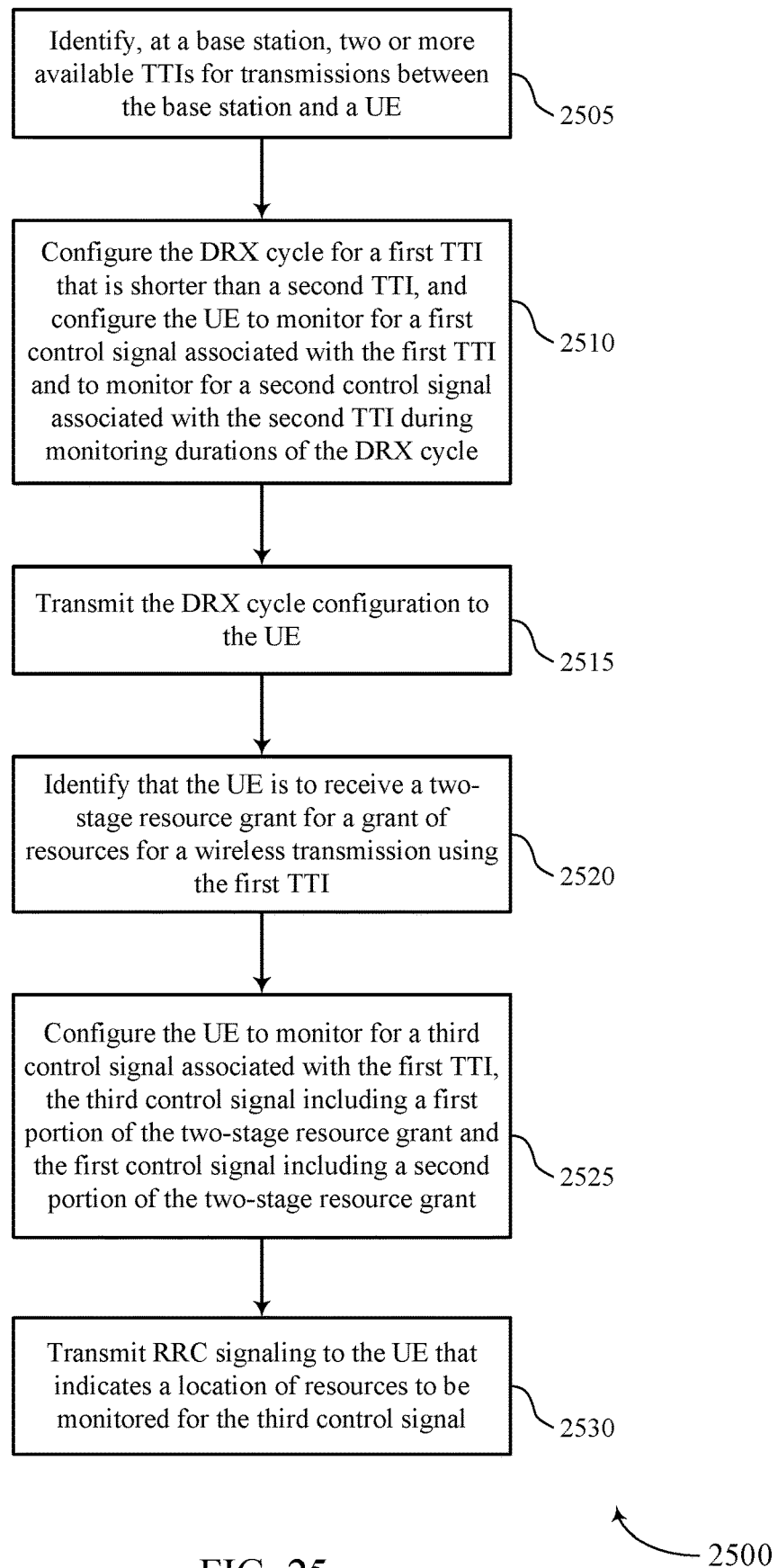

FIG. 25 shows a flowchart illustrating a method 2500 for discontinuous reception and scheduling techniques in wireless communication systems using multiple transmission time intervals in accordance with various aspects of the present disclosure. The operations of method 2500 may be implemented by a base station 105 or its components as described herein. For example, the operations of method 2500 may be performed by a base station scheduling module as described with reference to FIGS. 14 through 17. In some examples, a base station 105 may execute a set of codes to control the functional elements of the device to perform the functions described below. Additionally or alternatively, the base station 105 may perform aspects the functions described below using special-purpose hardware.

At block 2505 the base station 105 may identify two or more available TTIs for transmissions between the base station and a UE. The operations of block 2505 may be performed according to the methods described with reference to FIGS. 1 through 9. In certain examples, aspects of the operations of block 2505 may be performed by a TTI identification component as described with reference to FIGS. 14 through 17.

At block 2510 the base station 105 may configure a DRX cycle for a first TTI that is shorter than a second TTI, and configure the UE to monitor for a first control signal associated with the first TTI and to monitor for a second control signal associated with the second TTI during monitoring durations of the DRX cycle. The operations of block 2510 may be performed according to the methods described with reference to FIGS. 1 through 9. In certain examples, aspects of the operations of block 2510 may be performed by a DRX component as described with reference to FIGS. 14 through 17.

At block 2515 the base station 105 may transmit the DRX cycle configuration to the UE. The operations of block 2515 may be performed according to the methods described with reference to FIGS. 1 through 9. In certain examples, aspects of the operations of block 2515 may be performed by a configuration component as described with reference to FIGS. 14 through 17.

At block 2520 the base station 105 may identify that the UE is to receive a two-stage resource grant for a grant of resources for a wireless transmission using the first TTI. The operations of block 2520 may be performed according to the methods described with reference to FIGS. 1 through 9. In certain examples, aspects of the operations of block 2520 may be performed by a grant identification component as described with reference to FIGS. 14 through 17.

At block 2525 the base station 105 may configure the UE to monitor for a third control signal associated with the first TTI, the third control signal including a first portion of the two-stage resource grant and the first control signal including a second portion of the two-stage resource grant. The operations of block 2525 may be performed according to the methods described with reference to FIGS. 1 through 9. In certain examples, aspects of the operations of block 2525 may be performed by a configuration component as described with reference to FIGS. 14 through 17.

At block 2530 the base station 105 may transmit RRC signaling to the UE that indicates a location of resources to be monitored for the third control signal. The operations of block 2530 may be performed according to the methods described with reference to FIGS. 1 through 9. In certain examples, aspects of the operations of block 2530 may be performed by a RRC component as described with reference to FIGS. 14 through 17.

Figure 26:
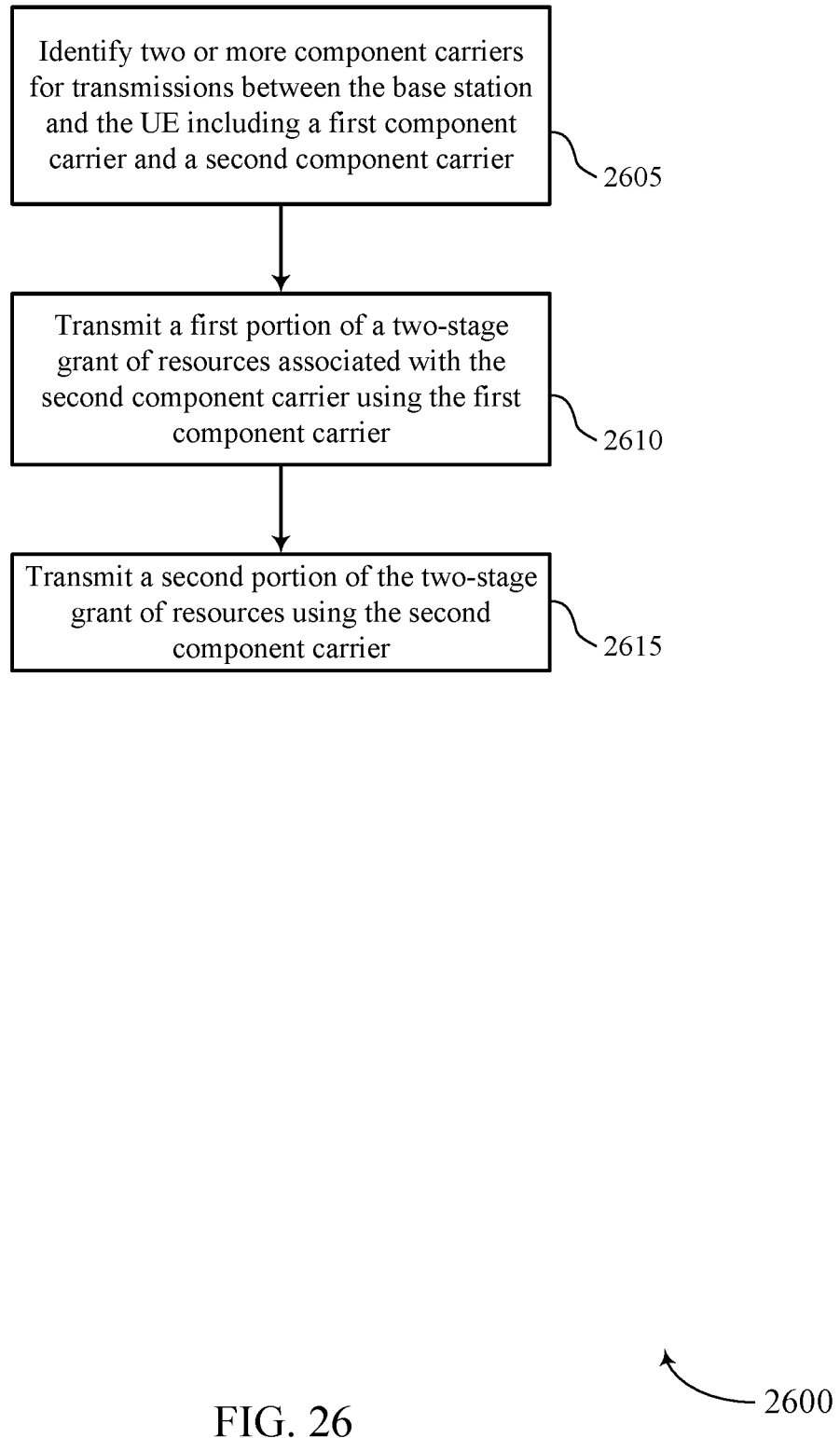

FIG. 26 shows a flowchart illustrating a method 2600 for discontinuous reception and scheduling techniques in wireless communication systems using multiple transmission time intervals in accordance with various aspects of the present disclosure. The operations of method 2600 may be implemented by a base station 105 or its components as described herein. For example, the operations of method 2600 may be performed by a base station scheduling module as described with reference to FIGS. 14 through 17. In some examples, a base station 105 may execute a set of codes to control the functional elements of the device to perform the functions described below. Additionally or alternatively, the base station 105 may perform aspects the functions described below using special-purpose hardware.

At block 2605 the base station 105 may identify two or more component carriers for transmissions between the base station and the UE including a first component carrier and a second component carrier. The operations of block 2605 may be performed according to the methods described with reference to FIGS. 1 through 9. In certain examples, aspects of the operations of block 2605 may be performed by a carrier aggregation component as described with reference to FIGS. 14 through 17.

At block 2610 the base station 105 may transmit a first portion of a two-stage grant of resources associated with the second component carrier using the first component carrier. The operations of block 2610 may be performed according to the methods described with reference to FIGS. 1 through 9. In certain examples, aspects of the operations of block 2610 may be performed by a grant identification component as described with reference to FIGS. 14 through 17.

At block 2615 the base station 105 may transmit a second portion of the two-stage grant of resources using the second component carrier. The operations of block 2615 may be performed according to the methods described with reference to FIGS. 1 through 9. In certain examples, aspects of the operations of block 2615 may be performed by a grant identification component as described with reference to FIGS. 14 through 17.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, at a base station, two or more available transmission time intervals (TTIs) for transmissions between the base station and a user equipment (UE);
   identifying a discontinuous reception (DRX) cycle configuration comprising a first DRX cycle and a second DRX cycle for the UE based at least in part on the two or more available TTIs;
   configuring the first DRX cycle identified for a first TTI that is longer than the second DRX cycle identified for a second TTI;
   configuring the UE to monitor for a control signal associated with the second TTI based on the first DRX cycle, wherein the control signal includes a first portion of a grant of resources for a wireless transmission using the second TTI;
   configuring one or more time windows for the UE to monitor for a second portion of the grant of resources; and
   transmitting the DRX cycle configuration to the UE.

2. The method of claim 1, further comprising:
   configuring the UE to reset an inactivity timer associated with the first DRX cycle responsive to determining that the control signal is received.

3. The method of claim 1, further comprising:
   configuring the UE to monitor for the first portion of the grant of resources during monitoring durations of the first DRX cycle for the first TTI.

4. The method of claim 1, further comprising:
   identifying two or more component carriers for transmissions between the base station and the UE including a first component carrier that has a third TTI and a second component carrier that has a fourth TTI that is shorter than the third TTI; and
   wherein the identifying the DRX cycle configuration further comprises configuring a third DRX cycle for the first component carrier and configuring a fourth DRX cycle for the second component carrier that is independent of the third DRX cycle.

5. The method of claim 1, further comprising:
   identifying two or more component carriers for transmissions between the base station and the UE including a first component carrier that has a third TTI and a second component carrier that has a fourth TTI that is shorter than the third TTI; and
   wherein the identifying the DRX cycle configuration further comprises configuring a third DRX cycle for the third TTI and monitoring of a second control signal associated with the second component carrier during monitoring durations of the third DRX cycle for the third TTI.

6. The method of claim 1, further comprising:
identifying two or more component carriers for transmissions between the base station and the UE including a first component carrier and a second component carrier;
transmitting a first portion of a second grant of resources associated with the second component carrier using the first component carrier; and
transmitting a second portion of the second grant of resources using the second component carrier.

7. The method of claim 6, wherein the first portion of the second grant of resources includes common information for a plurality of component carriers.

8. The method of claim 1, further comprising:
transmitting radio resource control (RRC) signaling to the UE that indicates a location of resources to be monitored for the control signal.

9. An apparatus for wireless communication, in a system comprising: a processor; memory in electronic communication with the processor; and instructions stored in the memory and operable, when executed by the processor, to cause the apparatus to:
identify, at a base station, two or more available transmission time intervals (TTIs) for transmissions between the base station and a user equipment (UE);
identify a discontinuous reception (DRX) cycle configuration comprising a first DRX cycle and a second DRX cycle for the UE based at least in part on the two or more available (TTIs);
configure the first DRX cycle identified for a first TTI that is longer than the second DRX cycle identified for a second TTI;
configure the UE to monitor for a control signal associated with the second TTI based on the first DRX cycle, wherein the control signal includes a first portion of a grant of resources for a wireless transmission using the second TTI;
configure one or more time windows for the UE to monitor for a second portion of the grant of resources; and
transmit the DRX cycle configuration to the UE.

10. The apparatus of claim 9, wherein the instructions are further executable by the processor to cause the apparatus to:
configure the UE to reset an inactivity timer associated with the first DRX cycle responsive to determining that the control signal is received.

11. The apparatus of claim 9, wherein the instructions are further executable by the processor to cause the apparatus to:
configure the UE to monitor for the first portion of the grant of resources during monitoring durations of the first DRX cycle for the first TTI.

12. The apparatus of claim 9, wherein the instructions are further executable by the processor to cause the apparatus to:
identify two or more component carriers for transmissions between the base station and the UE including a first component carrier that has a third TTI and a second component carrier that has a fourth TTI that is shorter than the third TTI; and
wherein the identifying the DRX cycle configuration further comprises configuring a third DRX cycle for the first component carrier and configuring a fourth DRX cycle for the second component carrier that is independent of the third DRX cycle.

13. The apparatus of claim 9, wherein the instructions are further executable by the processor to cause the apparatus to:
identify two or more component carriers for transmissions between the base station and the UE including a first component carrier that has a third TTI and a second component carrier that has a fourth TTI that is shorter than the third TTI; and
wherein the identifying the DRX cycle configuration further comprises configuring a third DRX cycle for the third TTI and monitoring of a second control signal associated with the second component carrier during monitoring durations of the third DRX cycle for the third TTI.

14. The apparatus of claim 9, wherein the instructions are further executable by the processor to cause the apparatus to:
identify two or more component carriers for transmissions between the base station and the UE including a first component carrier and a second component carrier;
transmit a first portion of a second grant of resources associated with the second component carrier using the first component carrier; and
transmit a second portion of the second grant of resources using the second component carrier.

15. The apparatus of claim 14, wherein the first portion of the second grant of resources includes common information for a plurality of component carriers.

16. The apparatus of claim 9, wherein the instructions are further executable by the processor to cause the apparatus to:
transmit radio resource control (RRC) signaling to the UE that indicates a location of resources to be monitored for the control signal.

17. An apparatus for wireless communication, comprising:
means for identifying, at a base station, two or more available transmission time intervals (TTIs) for transmissions between the base station and a user equipment (UE);
means for identifying a discontinuous reception (DRX) cycle configuration comprising a first DRX cycle and a second DRX cycle for the UE based at least in part on the two or more available TTIs;
means for configuring the first DRX cycle identified for a first TTI that is longer than the second DRX cycle identified for a second TTI;
means for configuring the UE to monitor for a control signal associated with the second TTI based on the first DRX cycle, wherein the control signal includes a first portion of a grant of resources for a wireless transmission using the second TTI;
means for configuring one or more time windows for the UE to monitor for a second portion of the grant of resources; and
means for transmitting the DRX cycle configuration to the UE.

18. The apparatus of claim 17, further comprising:
means for configuring the UE to reset an inactivity timer associated with the first DRX cycle responsive to determining that the control signal is received.

19. The apparatus of claim 17, further comprising:
means for configuring the UE to monitor for the first portion of the grant of resources during monitoring durations of the first DRX cycle for the first TTI.

20. The apparatus of claim 17, further comprising:
means for identifying two or more component carriers for transmissions between the base station and the UE including a first component carrier that has a third TTI and a second component carrier that has a fourth TTI that is shorter than the third TTI; and wherein the identifying the DRX cycle configuration further comprises configuring a third DRX cycle for the first component carrier and configuring a fourth DRX cycle for the second component carrier that is independent of the third DRX cycle.

21. The apparatus of claim 17, further comprising:
means for identifying two or more component carriers for transmissions between the base station and the UE including a first component carrier that has a third TTI and a second component carrier that has a fourth TTI that is shorter than the third TTI; and
wherein the identifying the DRX cycle configuration further comprises configuring a third DRX cycle for the third TTI and monitoring of a second control signal associated with the second component carrier during monitoring durations of the third DRX cycle for the third TTI.

22. The apparatus of claim 17, further comprising:
means for identifying two or more component carriers for transmissions between the base station and the UE including a first component carrier and a second component carrier;
means for transmitting a first portion of a second grant of resources associated with the second component carrier using the first component carrier; and
means for transmitting a second portion of the second grant of resources using the second component carrier.

23. The apparatus of claim 22, wherein the first portion of the second grant of resources includes common information for a plurality of component carriers.

24. The apparatus of claim 17, further comprising:
means for transmitting radio resource control (RRC) signaling to the UE that indicates a location of resources to be monitored for the control signal.

25. A non-transitory computer readable medium storing code for wireless communication, the code comprising instructions executable by a processor to:
identify, at a base station, two or more available transmission time intervals (TTIs) for transmissions between the base station and a user equipment (UE);
identify a discontinuous reception (DRX) cycle configuration comprising a first DRX cycle and a second DRX cycle for the UE based at least in part on the two or more available TTIs;
configure the first DRX cycle identified for a first TTI that is longer than the second DRX cycle identified for a second TTI;
configure the UE to monitor for a control signal associated with the second TTI based on the first DRX cycle, wherein the control signal includes a first portion of a grant of resources for a wireless transmission using the second TTI;

configure one or more time windows for the UE to monitor for a second portion of the grant of resources; and
transmit the DRX cycle configuration to the UE.

26. The non-transitory computer-readable medium of claim 25, wherein the instructions are executable to:
configure the UE to reset an inactivity timer associated with the first DRX cycle responsive to determining that the control signal is received.

27. The non-transitory computer-readable medium of claim 25, wherein the instructions are executable to:
configure the UE to monitor for the first portion of the grant of resources during monitoring durations of the first DRX cycle for the first TTI.

28. The non-transitory computer-readable medium of claim 25, wherein the instructions are executable to:
identify two or more component carriers for transmissions between the base station and the UE including a first component carrier that has a third TTI and a second component carrier that has a fourth TTI that is shorter than the third TTI; and
wherein the identifying the DRX cycle configuration further comprises configuring a third DRX cycle for the first component carrier and configuring a fourth DRX cycle for the second component carrier that is independent of the third DRX cycle.

29. The non-transitory computer-readable medium of claim 25, wherein the instructions are executable to:
identify two or more component carriers for transmissions between the base station and the UE including a first component carrier that has a third TTI and a second component carrier that has a fourth TTI that is shorter than the third TTI; and
wherein the identifying the DRX cycle configuration further comprises configuring a third DRX cycle for the third TTI and monitoring of a second control signal associated with the second component carrier during monitoring durations of the third DRX cycle for the third TTL TTI.

30. The non-transitory computer-readable medium of claim 25, wherein the instructions are executable to:
identify two or more component carriers for transmissions between the base station and the UE including a first component carrier and a second component carrier;
transmit a first portion of a second grant of resources associated with the second component carrier using the first component carrier; and
transmit a second portion of the second grant of resources using the second component carrier.

* * * * *